US008724515B2

(12) United States Patent
Averbuch et al.

(10) Patent No.: US 8,724,515 B2
(45) Date of Patent: May 13, 2014

(54) CONFIGURING A SECURE NETWORK

(75) Inventors: Aaron H. Averbuch, Seattle, WA (US);
David Davis, San Jose, CA (US);
Edward W. James, San Jose, CA (US);
Craig A. Hobbs, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 13/235,007

(22) Filed: Sep. 16, 2011

(65) Prior Publication Data
US 2012/0008529 A1 Jan. 12, 2012

Related U.S. Application Data

(63) Continuation-in-part of application No. 12/732,446, filed on Mar. 26, 2010.

(51) Int. Cl.
*H04L 12/28* (2006.01)
*H04W 4/00* (2009.01)

(52) U.S. Cl.
USPC .......................................... 370/255; 370/328

(58) Field of Classification Search
USPC .......................................... 370/254, 255, 328
See application file for complete search history.

(56) References Cited

U.S. PATENT DOCUMENTS

| 5,383,178 | A   |   | 1/1995  | Unverrich          |        |
|-----------|-----|---|---------|--------------------|--------|
| 5,396,485 | A   |   | 3/1995  | Ohno et al.        |        |
| 5,712,914 | A   | * | 1/1998  | Aucsmith et al.    | 380/30 |
| 5,758,083 | A   |   | 5/1998  | Singh et al.       |        |
| 5,768,483 | A   |   | 6/1998  | Maniwa et al.      |        |
| 5,774,667 | A   |   | 6/1998  | Garvey et al.      |        |
| 5,838,907 | A   |   | 11/1998 | Hansen             |        |
| 5,974,237 | A   |   | 10/1999 | Shurmer et al.     |        |
| 6,006,272 | A   |   | 12/1999 | Aravamudan et al.  |        |
| 6,023,723 | A   |   | 2/2000  | McCormick et al.   |        |
| 6,454,306 | B1  |   | 9/2002  | Cunningham et al.  |        |
| 6,530,018 | B2  |   | 3/2003  | Fleming, III       |        |

(Continued)

FOREIGN PATENT DOCUMENTS

| EP | 1315334 A1 | 5/2003  |
|----|------------|---------|
| EP | 1370025 A1 | 12/2003 |

(Continued)

OTHER PUBLICATIONS

PCT Oct. 11, 2012 Notification Concerning Transmittal of International Preliminary Report on Patentability and the International Preliminary Report on Patentability and Written Opinion of the International Searching Authority from Application No. PCT/US2011/024462; 9 pages.

(Continued)

*Primary Examiner* — Ronald Abelson
(74) *Attorney, Agent, or Firm* — Patterson & Sheridan, LLP

(57) ABSTRACT

Techniques are presented for configuring a networking device to provide secure wireless connectivity to one or more client devices. In one embodiment, a networking device is discovered that is within a wireless connectivity range from a first client device. The networking device is configured to provide wireless connectivity to the first client device. The first client device is configured to initiate a first wireless connection, without requiring a user to specify any network settings. The networking device is configured to authenticate a user to access a user interface for configuring the networking device, where the user is not authenticated based on any password.

15 Claims, 13 Drawing Sheets

(56) References Cited

U.S. PATENT DOCUMENTS

| | | |
|---|---|---|
| 6,584,074 B1 | 6/2003 | Vasamsetti et al. |
| 6,728,262 B1 | 4/2004 | Woram |
| 6,778,505 B1 | 8/2004 | Bullman et al. |
| 6,801,941 B1 | 10/2004 | Stephens et al. |
| 6,892,245 B1 | 5/2005 | Crump et al. |
| 6,925,085 B1 | 8/2005 | Krishna et al. |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1 | 3/2006 | Gelvin et al. |
| 7,020,720 B1 | 3/2006 | Donahue et al. |
| 7,027,808 B2 | 4/2006 | Wesby |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,200,551 B1 | 4/2007 | Senez |
| 7,240,106 B2 | 7/2007 | Cochran et al. |
| 7,249,171 B2 | 7/2007 | Goto |
| 7,269,653 B2 | 9/2007 | Mentze et al. |
| 7,283,517 B2 | 10/2007 | Yan et al. |
| 7,310,664 B1 | 12/2007 | Merchant et al. |
| 7,319,873 B2 | 1/2008 | Zhang et al. |
| 7,340,512 B2 | 3/2008 | Cochran et al. |
| 7,392,310 B2 | 6/2008 | Motoyama et al. |
| 7,418,702 B2 | 8/2008 | Tsao et al. |
| 7,421,466 B2 | 9/2008 | Haines |
| 7,457,737 B2 | 11/2008 | Patiejunas |
| 7,475,133 B2 | 1/2009 | Nuggehalli |
| 7,496,660 B2 | 2/2009 | Blaisdell et al. |
| 7,506,048 B1 | 3/2009 | Motoyama et al. |
| 7,509,415 B2 | 3/2009 | Baekelmans et al. |
| 7,565,418 B2 | 7/2009 | Ferrari et al. |
| 7,581,039 B2 | 8/2009 | Martinez et al. |
| 7,657,612 B2 | 2/2010 | Manchester et al. |
| 7,769,409 B2 | 8/2010 | Harris et al. |
| 7,783,777 B1 | 8/2010 | Pabla et al. |
| 7,787,416 B2 | 8/2010 | Gidwani |
| 7,823,199 B1 | 10/2010 | Rathi et al. |
| 7,853,880 B2 | 12/2010 | Porter |
| 2001/0039580 A1 | 11/2001 | Walker et al. |
| 2002/0004935 A1 | 1/2002 | Huotari et al. |
| 2002/0026503 A1 | 2/2002 | Bendinelli et al. |
| 2002/0026505 A1 | 2/2002 | Terry |
| 2002/0112076 A1 | 8/2002 | Rueda et al. |
| 2002/0116544 A1 | 8/2002 | Barnard et al. |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0196463 A1 | 12/2002 | Schlonski et al. |
| 2003/0005112 A1 | 1/2003 | Krautkremer |
| 2003/0018889 A1 | 1/2003 | Burnett et al. |
| 2003/0033402 A1 | 2/2003 | Battat et al. |
| 2003/0041238 A1 | 2/2003 | French et al. |
| 2003/0061336 A1 | 3/2003 | Van Den Bosch et al. |
| 2003/0069947 A1 | 4/2003 | Lipinski |
| 2003/0078965 A1 | 4/2003 | Cocotis et al. |
| 2003/0078999 A1 | 4/2003 | Lund et al. |
| 2003/0086425 A1 | 5/2003 | Bearden et al. |
| 2003/0097439 A1 | 5/2003 | Strayer et al. |
| 2003/0115298 A1 | 6/2003 | Baker |
| 2003/0115314 A1 | 6/2003 | Kawashima |
| 2003/0187985 A1 | 10/2003 | Rohling et al. |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0221122 A1 | 11/2003 | Hatori |
| 2003/0229688 A1 | 12/2003 | Liang |
| 2004/0003292 A1 | 1/2004 | Kato |
| 2004/0005873 A1 | 1/2004 | Groenendaal et al. |
| 2004/0015575 A1 | 1/2004 | Motoyama |
| 2004/0030620 A1 | 2/2004 | Benjamin et al. |
| 2004/0039704 A1 | 2/2004 | Gilliam et al. |
| 2004/0040023 A1 | 2/2004 | Ellis et al. |
| 2004/0064558 A1 | 4/2004 | Miyake |
| 2004/0083299 A1 | 4/2004 | Dietz et al. |
| 2004/0093383 A1 | 5/2004 | Huang et al. |
| 2004/0111505 A1 | 6/2004 | Callahan et al. |
| 2004/0155899 A1 | 8/2004 | Conrad |
| 2004/0156346 A1 | 8/2004 | O'Neill |
| 2004/0162986 A1 | 8/2004 | Metzger |
| 2004/0172469 A1 | 9/2004 | Takahashi et al. |
| 2004/0193709 A1 | 9/2004 | Selvaggi et al. |
| 2004/0199630 A1 | 10/2004 | Sarkissian et al. |
| 2004/0199647 A1 | 10/2004 | Ramarao et al. |
| 2004/0203592 A1* | 10/2004 | Kermode et al. ............ 455/411 |
| 2004/0204051 A1 | 10/2004 | Scott et al. |
| 2004/0236759 A1 | 11/2004 | Young |
| 2004/0255023 A1 | 12/2004 | Motoyama et al. |
| 2005/0004866 A1 | 1/2005 | Bonalle et al. |
| 2005/0005013 A1 | 1/2005 | Saint-Hilaire et al. |
| 2005/0018241 A1 | 1/2005 | Azami |
| 2005/0050189 A1 | 3/2005 | Yang et al. |
| 2005/0054326 A1 | 3/2005 | Rogers |
| 2005/0063350 A1 | 3/2005 | Choudhury et al. |
| 2005/0085244 A1 | 4/2005 | Choi et al. |
| 2005/0086197 A1 | 4/2005 | Boubez et al. |
| 2005/0086282 A1 | 4/2005 | Anderson et al. |
| 2005/0091504 A1 | 4/2005 | Shirogane |
| 2005/0111420 A1 | 5/2005 | Fujii |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0160138 A1 | 7/2005 | Ishidoshiro |
| 2005/0165828 A1 | 7/2005 | Lango et al. |
| 2005/0165919 A1 | 7/2005 | Qian et al. |
| 2005/0184852 A1 | 8/2005 | Lee |
| 2005/0198221 A1 | 9/2005 | Manchester et al. |
| 2005/0198274 A1 | 9/2005 | Day |
| 2005/0216602 A1 | 9/2005 | Armstrong et al. |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240665 A1 | 10/2005 | Gu et al. |
| 2005/0240758 A1 | 10/2005 | Lord et al. |
| 2005/0243777 A1 | 11/2005 | Fong |
| 2006/0015939 A1 | 1/2006 | Aston et al. |
| 2006/0031457 A1 | 2/2006 | Motoyama |
| 2006/0036847 A1 | 2/2006 | Bush et al. |
| 2006/0037036 A1 | 2/2006 | Min et al. |
| 2006/0041891 A1 | 2/2006 | Aaron |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0130286 A1 | 6/2006 | Igarashi et al. |
| 2006/0153080 A1 | 7/2006 | Palm |
| 2006/0168195 A1 | 7/2006 | Maturana et al. |
| 2006/0172734 A1 | 8/2006 | Tak |
| 2006/0258341 A1 | 11/2006 | Miller et al. |
| 2006/0280189 A1 | 12/2006 | McRae et al. |
| 2006/0291443 A1 | 12/2006 | Harrington et al. |
| 2007/0015463 A1 | 1/2007 | Abel et al. |
| 2007/0022185 A1 | 1/2007 | Hamilton et al. |
| 2007/0058567 A1 | 3/2007 | Harrington et al. |
| 2007/0106768 A1 | 5/2007 | Frietsch et al. |
| 2007/0111568 A1 | 5/2007 | Ferrari et al. |
| 2007/0115950 A1 | 5/2007 | Karaoguz et al. |
| 2007/0130286 A1 | 6/2007 | Hopmann et al. |
| 2007/0133569 A1 | 6/2007 | Lee et al. |
| 2007/0143749 A1 | 6/2007 | Date et al. |
| 2007/0204150 A1 | 8/2007 | Jokela et al. |
| 2007/0268506 A1 | 11/2007 | Zeldin |
| 2007/0268515 A1 | 11/2007 | Freund et al. |
| 2007/0268516 A1 | 11/2007 | Bugwadia et al. |
| 2008/0008125 A1* | 1/2008 | Pham et al. ................... 370/329 |
| 2008/0049779 A1 | 2/2008 | Hopmann et al. |
| 2008/0052384 A1 | 2/2008 | Marl et al. |
| 2008/0065760 A1 | 3/2008 | Damm et al. |
| 2008/0134164 A1 | 6/2008 | Stich et al. |
| 2008/0175187 A1 | 7/2008 | Lowry et al. |
| 2008/0216154 A1 | 9/2008 | Fontaine |

(56) References Cited

U.S. PATENT DOCUMENTS

| | | | |
|---|---|---|---|
| 2008/0243699 | A1 | 10/2008 | Hilerio et al. |
| 2009/0017832 | A1 | 1/2009 | Tebbs et al. |
| 2009/0019141 | A1 | 1/2009 | Bush et al. |
| 2009/0019147 | A1 | 1/2009 | Ahlers et al. |
| 2009/0019314 | A1 | 1/2009 | Younger et al. |
| 2009/0052338 | A1 | 2/2009 | Kelley et al. |
| 2009/0055514 | A1 | 2/2009 | Tebbs et al. |
| 2010/0035595 | A1 | 2/2010 | Duggal et al. |
| 2010/0093278 | A1 | 4/2010 | Abel et al. |
| 2010/0250725 | A1 | 9/2010 | Meenan et al. |
| 2011/0047254 | A1* | 2/2011 | Vainionpaa et al. .......... 709/222 |
| 2012/0008529 | A1 | 1/2012 | Averbuch et al. |

FOREIGN PATENT DOCUMENTS

| | | | |
|---|---|---|---|
| EP | 1538792 | A2 | 6/2005 |
| EP | 1553729 | A1 | 7/2005 |
| EP | 1638258 | A1 | 3/2006 |
| EP | 1639751 | A1 | 3/2006 |
| EP | 1701478 | A1 | 9/2006 |
| EP | 1894314 | A2 | 3/2008 |
| EP | 1965541 | A1 | 9/2008 |
| EP | 2324652 | A1 | 5/2011 |
| GB | 2411801 | A | 9/2005 |
| JP | 2001222497 | A | 8/2001 |
| JP | 2001352328 | A | 12/2001 |
| KR | 20040047209 | A | 6/2004 |
| KR | 10-20050031175 | A | 4/2005 |
| KR | 10-20050078541 | A | 8/2005 |
| KR | 10-20050094247 | A | 9/2005 |
| WO | 2005004401 | A1 | 1/2005 |
| WO | 2007001629 | A2 | 1/2007 |
| WO | 2007136804 | A2 | 11/2007 |
| WO | 2008156898 | A2 | 12/2008 |
| WO | 2009011962 | A1 | 1/2009 |
| WO | 2009011963 | A1 | 1/2009 |
| WO | 2009011964 | A2 | 1/2009 |
| WO | 2009011965 | A1 | 1/2009 |
| WO | 2009011966 | A1 | 1/2009 |
| WO | 2010016855 | A1 | 2/2010 |
| WO | 2011119264 | A1 | 9/2011 |

OTHER PUBLICATIONS

EPO-Oct. 24, 2012 Response to Written Opinion from European Application 0876920.4; 21 pages.
EPO Apr. 5, 2012 Search Report and Written Opinion from European Application 08769420.4; 8 pages.
Karygiannos, Tom, et al., "Wireless Network Security 802.11 Bluetooth and Handheld Devices", NIST Special Publication 800-48, Technology Administration, Dept. of Commerce, 2002, 119 pages.
U.S. Appl. No. 13/235,007, filed Sep. 16, 2011, entitled "Configuring a Secure Network", Inventor(s) Aaron H. Averbunch, et al.
EPO Nov. 15, 2007 European Search Report and Opinion from European Application No. EP0717509; 8 pages.
PCT Aug. 7, 2007 International Search Report from International Application PCT/US06/17500; 1 page.
PCT Jan. 4, 2008 International Search Report from International Application PCT/US07/12016; 1 page.
Khedr, Mohamed, et al., "Acan-Ad Hoc Context Aware Networks," Online! 2002, XP002300569; 5 pages; http://citeseerx.ist.psu.edu/viewdoc/summary?doi=10.1.1.20.1469.
Krishnamurthy, Lakshman, et al., "Meeting the Demands of the Digital Home with high-Speed Multi-Hop Wireless Networks", Intel Technology Journal, vol. 6, Nov. 15, 2002, pp. 57-68; http://download.intel.com/technology/itj/2002/volume06issue04/vol6iss4_interoperable6_home_infrastructure.pdf.
PCT Oct. 27, 2004 International Search Report from International Application PCT/US2004/021429; 3 pages.
PCT Jan. 3, 2006 International Preliminary Report on Patentability and Written Opinion of the International Search Authority from International Application PCT/US2004/021429; 7 pages.
PCT Dec. 24, 2007 International Preliminary Report on Patentability and Written Opinion of the International Search Authory form International Application PCT/US2006/17500; 6 pages.
PCT Nov. 21, 2008 International Preliminary Report on Patentability and Written Opinion of the International Search Authority from International Application PCT/US2007/012016; 5 pages.
PCT Apr. 24, 2009 International Search Report from International Application PCT/US2008/08544; 2 pages.
PCT Aug. 2, 2011 International Preliminary Report on Patentability and Written Opinion of the International Search Authority from International Application PCT/US2008/08544; 7 pages.
PCT Aug. 25, 2011 International Search Report and Written Opinion of the International Searching Authority from Internation Application PCT/US2011/024462.
Rasheed, Vasser, et ai, "Home Interoperability Framework for the Digital Home," Intel Technology Journal, vol. 6, Nov. 15, 2002, pp. 5-16; http://download.intel.com/technology/itj/2002/volume06issue04/vol6iss4_interoperable_home_infrastructure.pdf.
Walker, Mark, et al., "Remote I/O: Freeing the Experience from the Platform with UPnP Architecture", Intel Technology Journal, vol. 6, Nov. 15, 2002, pp. 30-36; http://download.intel.com/technology/itj/2002/volume06issue04/vol6iss4_interoperable_home_infrastructure.pdf.
"Wi-Fi Alliance™ for Wi-Fi Protected Setup Specification," Version 1.0h, Dec. 2006, 110 pages.
PCT Notification of the International Search Report and the Written Opinion of the International Searching Authority, or the Declaration, International Application No. PCT/US2008/063318, mailed Sep. 25, 2008, 6 pages.
U.S. Appl. No. 11/696,638, filed Apr. 4, 2007, entitled "Network Management Providing Network Health Information and Lockdown Security," Inventor(s) Steve Bush et al., U.S. Patent No. 8,316,438, issued Nov. 20, 2012.
Marcia Zangrilli, et al., "Using Passive Traces of Application Traffic in a Network Monitoring System," © 2004 IEEE, 11 pages.
Kazuya Kubo, et al., "Hybrid Peer-to-Peer System for Network Monitoring of Field Devices", Downloaded May 14, 2009 from IEEE Xplore, © 2003 SICE, 6 pages.
International Search Report for International Application No. PCT/US2008/063335 mailed Sep. 22, 2008 (1 page).
Written Opinion of the International Searching Authority for International Application No. PCT/US2008/063335 mailed Sep. 22, 2008 (4 pages).
International Search Report for International Application No. PCT/US2008/063308 mailed Oct. 30, 2008 (2 pages).
Written Opinion of the International Searching Authority for International Application No. PCT/US2008/063308 mailed Oct. 30, 2008 (4 pages).
International Search Report for International Application No. PCT/US2008/063333 mailed Sep. 26, 2008 (2 pages).
Written Opinion of the International Searching Authority for International Application No. PCT/US2008/063333 mailed Sep. 26, 2008 (4 pages).
International Search Report for International Application No. PCT/US2008/059490 mailed Apr. 21, 2009 (2 pages).
International Preliminary Report on Patentability issued Oct. 6, 2009 (1 page) and Written Opinion of the International Searching Authority mailed Apr. 21, 2009 (3 pages) for International Application No. PCT/US2008/059490.
Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.
Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.
Microsoft Corporation, "Windows Connect Now-UFD for Windows XP Specification," © 2010, Updated Sep. 15, 2006, 1 page; http://www.microsoft.com/whdc/connect/Rally/WCN-UFO_XPspec.mspx.

(56) References Cited

OTHER PUBLICATIONS

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

"Near Field communication White Paper", Ecma International, 2005, 12 pages; http://www.ecma-international.org/activities/Communications/tc32-tg19-2005-012.pdf.

Microsoft Corporation, "Windows Connect Now-UFD Windows Vista" Version 1.0 © 2010—Sep. 15, 2006, 28 pages; http://www.microsoft.com/whdc/connect/Rally/WCN-UFD_Vistaspec.doc.

Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.

Microsoft Corporation, "Windows Connect Now-UFO for Windows XP," Version 1.1 © 2010-Sep. 15, 2006, 33 pages; http://www.microsoft.com/whdc/connect/Rally/WCN-Netspec.doc.

Wi-Fi Certified™ for Wi-Fi Protected Setup™: Easing the User Experience for Home and Small Office Wi-Fi® Networks, © 2007, 14 pages; http://www.wi-fi.org/files/kc/20090123_Wi-Fi_Protected_Setup.pdf.

Cisco Access Router USB Flash Memory Module and USB eToken Hardware Installation Guide, © 2006 Cisco Systems, Inc., 12 pages; https://www.cisco.com/en/US/docs/routers/access/2800/hardware/notes/mithril.html.

Flip Video, "Quick Start Guide: FlipshareTV," © 2009 Cisco Systems, Inc., 19 pages; http://www.theflip.com/pdf/en-US/FlipShareTVQuickStartGuide.pdf.

Microsoft Corporation, "Windows Connect Now—Access Point has No USB Port in Wireless Networking," © 2010, printed Mar. 24, 2010, 2 pages; http://www.microsoft.com/communities/newsgroups/enus/default.aspx?dg=microsoft.public.
windows,networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.

"Universal Plug and Play Device Architecture, UPnP, Version 1.0", Microsoft corporation, Protocols, Jun. 8, 2000; 54 pages; http://upnp.org/specs/arch/UPnPDA10_20000613.pdf.

U.S. Appl. No. 13/029,335, filed Feb. 17, 2011, entitled "Network Management", Inventor(s) Steven M. Bush et al. (PURE-1-1019-CON). U.S. Patent No. 8,463,890, issued Jun. 11, 2013.

U.S. Appl. No. 13/030,982, filed Feb. 18, 2011, entitled "Network Management", Inventor(s) Steven M. Bush et al. (PURE-1-1019-DIV1).

U.S. Appl. No. 13/031,121, filed Feb. 18, 2011, entitled "Network Management", Inventor(s) Steven M. Bush et al. (PURE-1-1019-DIV2). U.S. Patent No. 8,484,332, issued Jul. 9, 2013.

\* cited by examiner

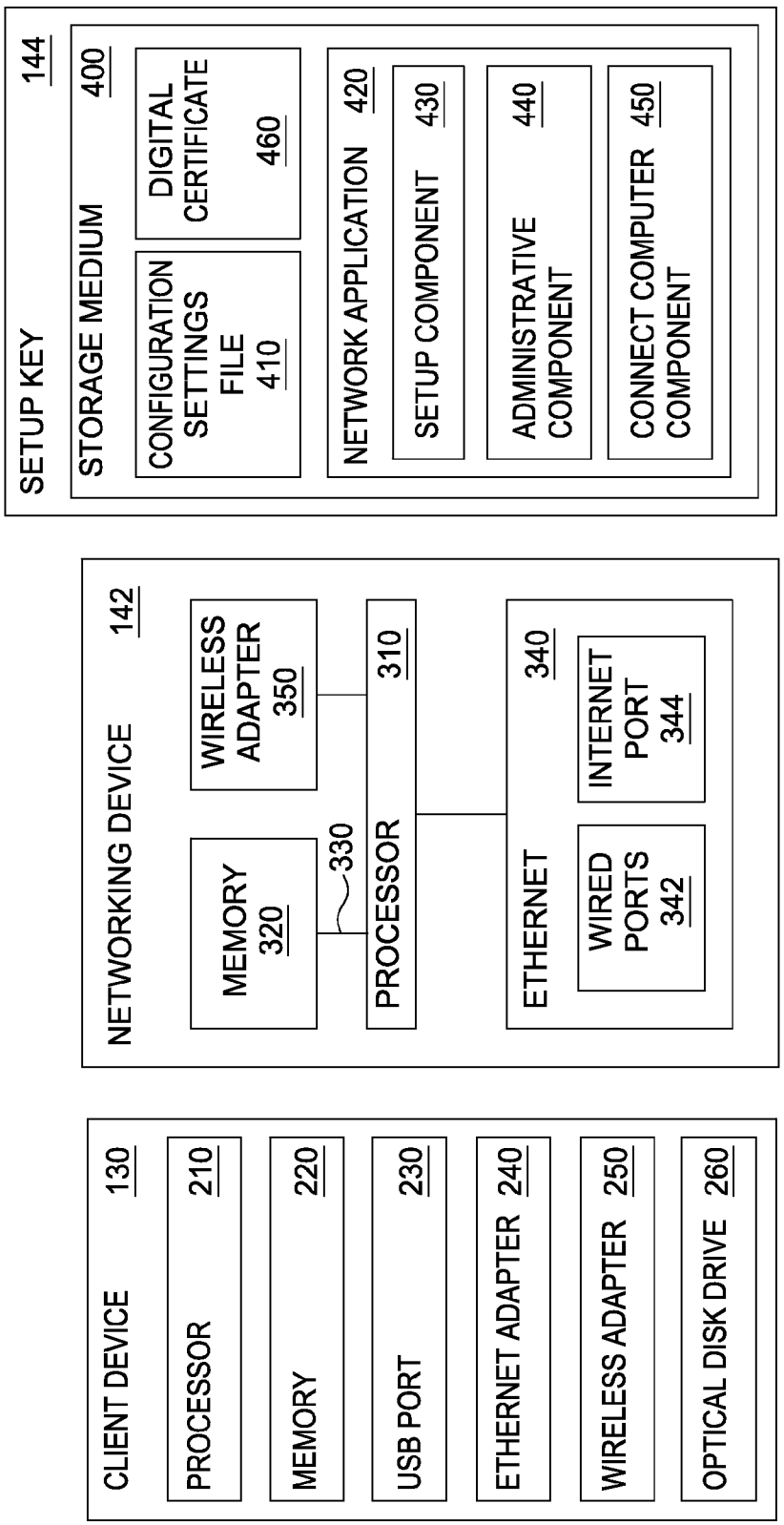

CONFIGURING A SECURE NETWORK

CROSS-REFERENCE TO RELATED APPLICATION

This is a continuation-in-part of co-pending U.S. patent application Ser. No. 12/732,446 filed Mar. 26, 2010, which is incorporated herein by reference in its entirety.

TECHNICAL FIELD

Embodiments presented in this disclosure generally relate to the field of computer networks and, more particularly, to techniques for configuring secure networks.

BACKGROUND

Computing devices and computer networking have become an integral part of daily life in modern day society. Personal and business use of computing devices, such as laptops, personal computers, smartphones (i.e., cell phones offering advanced computing capabilities), tablets, personal digital assistants (PDAs), and the like, have exploded in recent years. In addition, other electronic devices such as printers, gaming devices, smart appliances, etc. have also surged in popularity. For example, a home may include one or more personal computers, a printing device, a gaming device shared by family members and smartphones owned by individual family members. Small businesses may provide personal computers and smartphones or PDAs for employees, in addition to printers shared by the employees.

Private local area networks (LANs) may be used to enhance the usefulness of computing devices and other electronic devices in homes and small business. In a LAN, devices may be linked together through a networking device, such as a router. The router may be connected to other private and public networks, such as the Internet. In such a configuration, the router facilitates communication by routing packets of data between the devices within the LAN and also to and from other devices in private and public networks outside the LAN. Thus, home users and small businesses may use the LANs to enable computing devices and other electronic devices to communicate both within and outside the private network.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

FIG. 2 is a block diagram illustrating components of a client device of FIG. 1G, according to an example embodiment presented in this disclosure.

FIG. 3 is a block diagram illustrating components of the networking device of FIG. 1G, according to an example embodiment presented in this disclosure.

FIG. 4 is a block diagram illustrating components of a setup key of FIG. 1G, according to an example embodiment presented in this disclosure.

DESCRIPTION

Overview

Figure 1A:
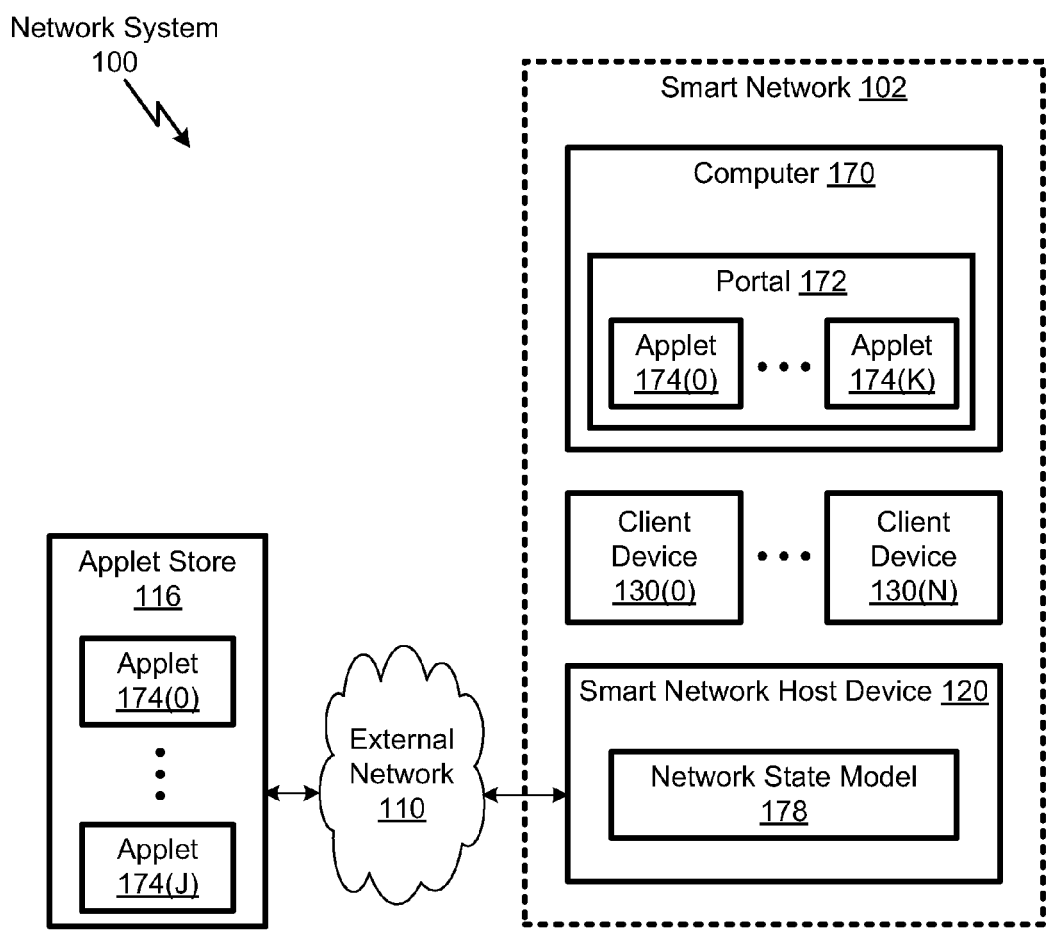
FIG. 1A is an exemplary illustration of an overarching network system configured to implement one or more embodiments presented in this disclosure.

Embodiments of the invention provide a method, logic encoded in one or more tangible media, and system for performing an operation that includes discovering a networking device within a wireless connectivity range from a first client device. The operation also includes configuring the networking device to provide wireless connectivity according to network settings generated for the networking device. The operation also includes initiating, by the first client device and based on the network settings, a first wireless connection to the networking device. The first wireless connection is initiated to request, on behalf of a user, access to a user interface for configuring the networking device. The operation also includes, by the networking device and prior to granting access, authenticating the user requesting access.

DESCRIPTION OF EXAMPLE EMBODIMENTS

Embodiments presented in this disclosure provide techniques for configuring a networking device, such as a wireless router, to provide secure wireless connectivity to one or more client devices. One embodiment provides a small flash memory device (referred to as a setup key) storing a network application. When a user connects the setup key to a client device, the client device executes the network application. In one embodiment, the setup key may be connected to the client device via a Universal Serial Bus (USB) port on the client device. The network application discovers and configures the networking device, using network settings generated for the networking device. The network settings may include a network identifier, a network password, and a wireless security protocol, and the like. Using the networking settings, the network application configures the client device to initiate a wireless connection to the configured networking device. The wireless connection is created without requiring the user to specify the network settings. The network application may store the network settings onto the setup key. The user may then connect the setup key to other devices, to configure other devices to connect to the wireless network provided by the configured networking device. Again, the client devices are configured to access the networking device without requiring the user to directly specify the network settings.

In one embodiment, the network application may also establish communication between the networking device and another network, such as the Internet. The networking device is further configured to authenticate a user to access a user interface for configuring the networking device. Rather than requiring the user to provide (and remember) a password, a user may be authenticated using information stored on the setup key. In some embodiments, the user is authenticated based on a digital certificate received from the networking application. Advantageously, by using the setup key, the user may configure a secure network more conveniently and/or efficiently at least in some cases. Should the user subsequently desire to further configure the networking device, the user may also access the user interface for configuring the networking device.

FIG. 1A is an exemplary illustration of an overarching network system 100 configured to implement one or more aspects presented in the disclosure. The network system 100 comprises a smart network 102, an external network 110 and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
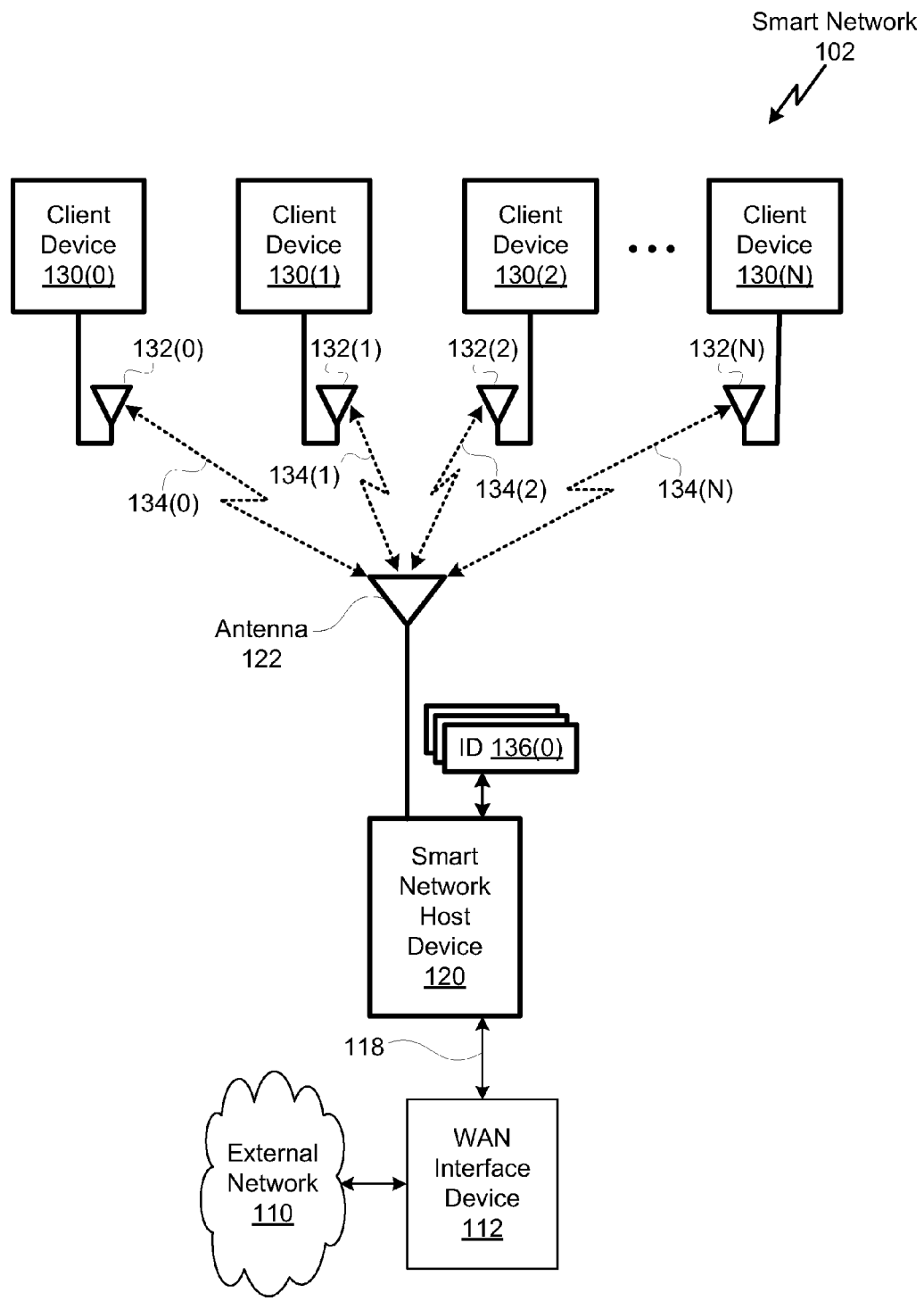
FIG. 1B illustrates the smart home network of FIG. 1A, according to one example embodiment presented in this disclosure.

FIG. 1B illustrates the smart home network 102 of FIG. 1A, according to one example embodiment of the present disclosure. As shown, the smart network 102 comprises a smart network host device 120, one or more client devices 130 and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present invention. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
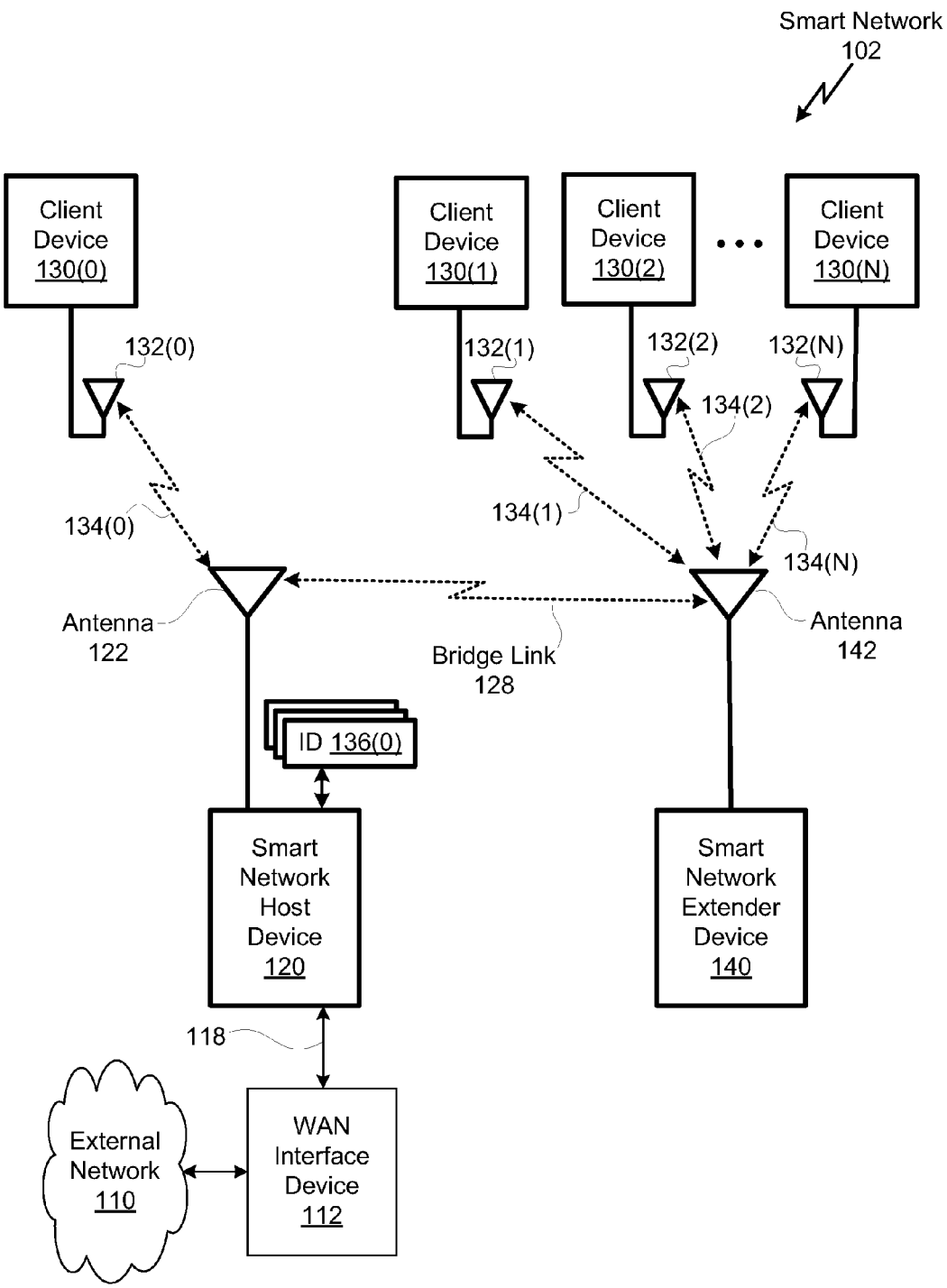
FIG. 1C illustrates the smart home network of FIG. 1A, according to another example embodiment presented in this disclosure.

FIG. 1C illustrates the smart home network 102 of FIG. 1A, according to another example embodiment of the present disclosure. Here, the smart network 102 comprises a smart network host device 120, a smart network extender device 140, one or more client devices 130 and a wide area network (WAN) interface device 112, coupled to the external network 110 of FIG. 1A. The WAN interface device 112, smart network host device 120 and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
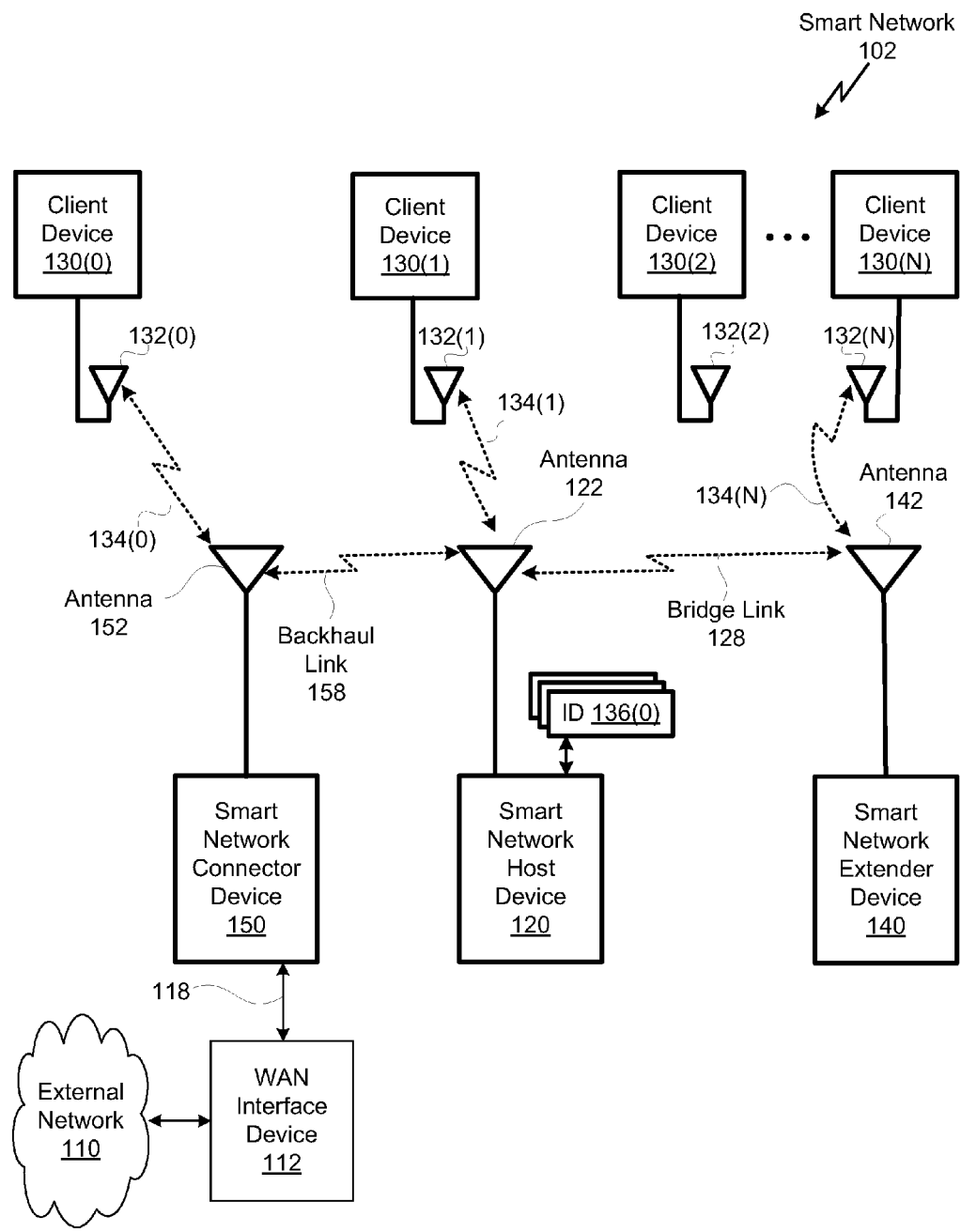
FIG. 1D illustrates the smart home network of FIG. 1A, according to yet another example embodiment presented in this disclosure.

FIG. 1D illustrates the smart home network 102 of FIG. 1A, according to yet another example embodiment of the present disclosure. Here, the smart network 102 comprises a smart network host device 120, a smart network extender device 140, one or more client devices 130, a smart network connector device 150 and a wide area network (WAN) interface device 112, coupled to the external network 110 of FIG. 1A. The WAN interface device 112, smart network extender device 140 and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128 and backhaul link 158. This network data traffic is also forwarded by smart network extender device 140, smart network host device 120 and smart network connector device 150. A client device 130 may connect directly to any one of the network extender device 140, smart network host device 120 or smart network connector device 150. As shown, client device 130(0) is connected to smart network connector device 150 via wireless client link 134(0), client device 130(1) is connected to smart network host device 120 via wireless client link 134(1) and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
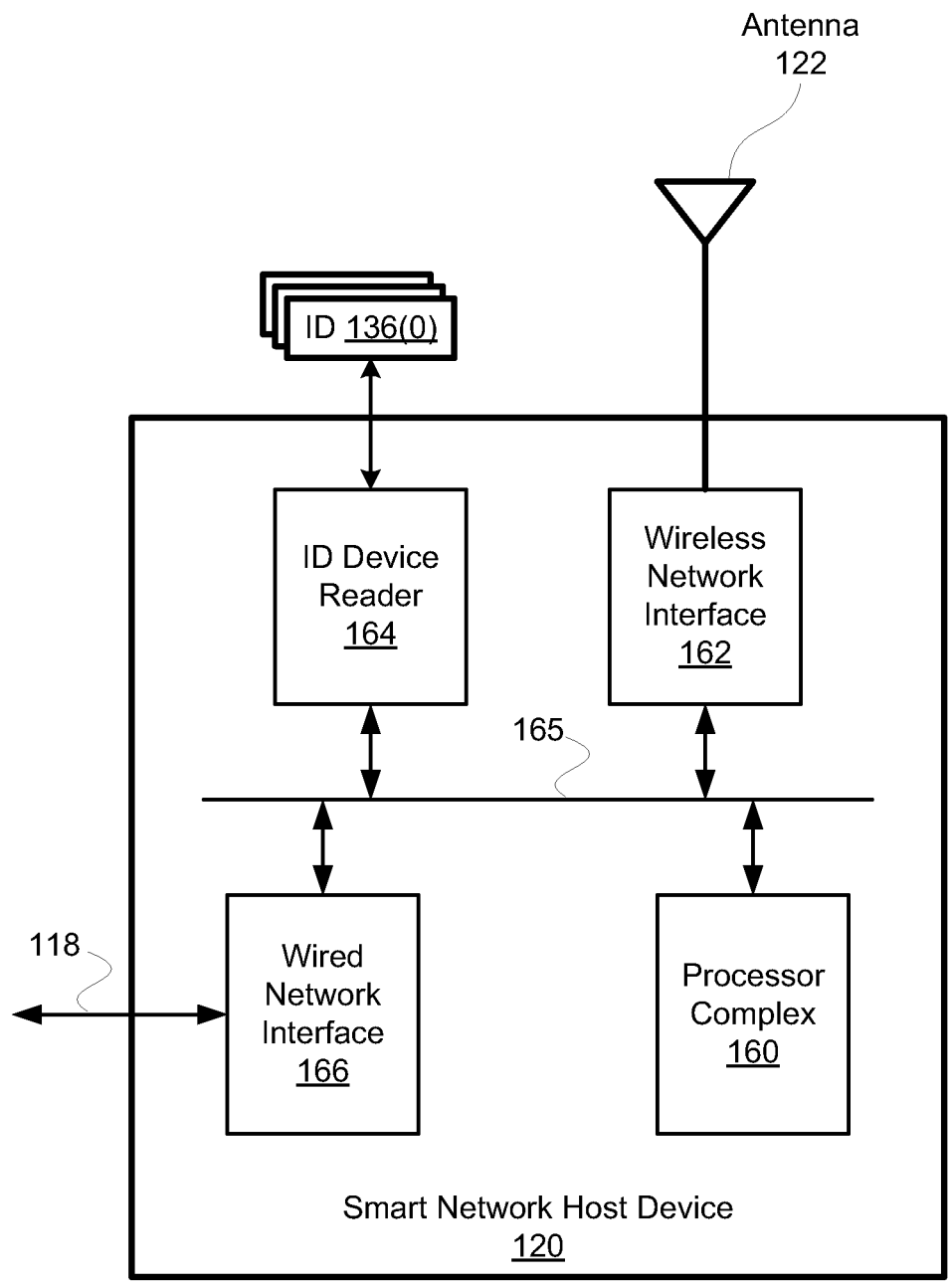
FIG. 1E is a more detailed illustration of the smart network host device of FIG. 1A, according to one example embodiment presented in this disclosure.

FIG. 1E is a more detailed illustration of the smart network host device 120 of FIG. 1A, according to one example embodiment of the present disclosure. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166 and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
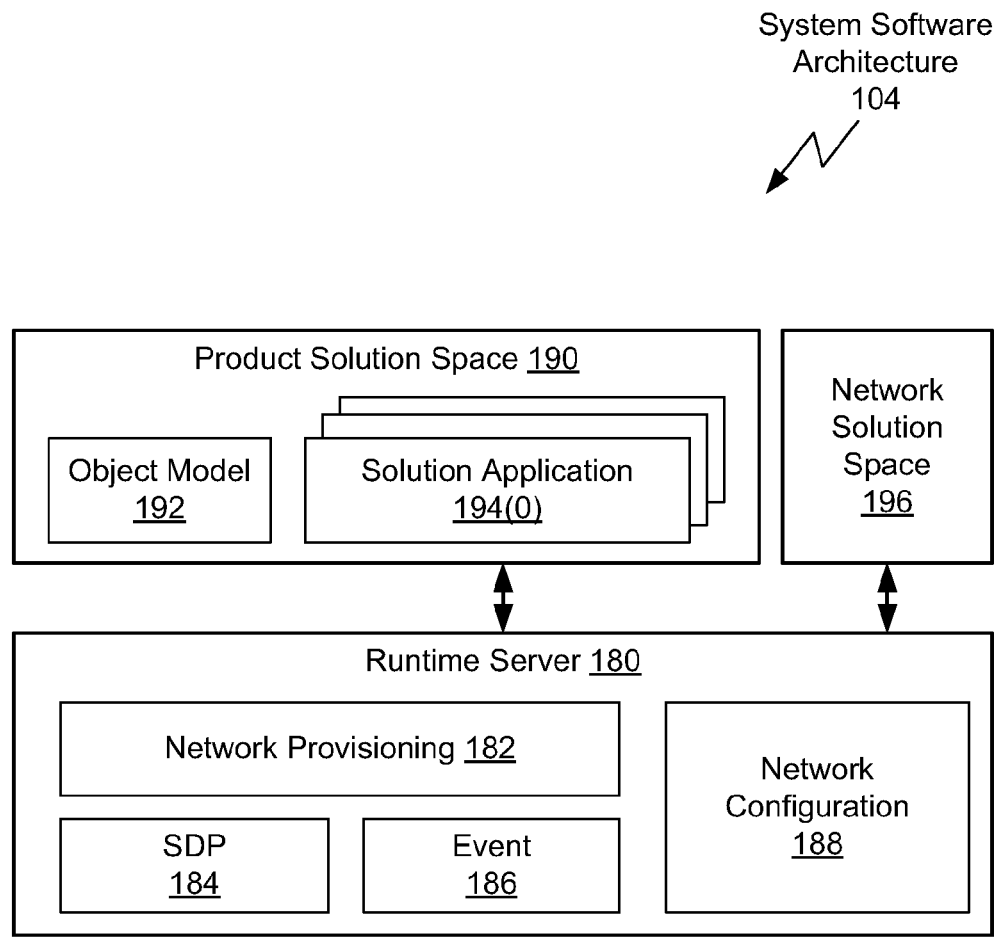
FIG. 1F illustrates a system software architecture for the smart network host device of FIG. 1E, according to one example embodiment presented in this disclosure.

FIG. 1F illustrates a system software architecture for the smart network host device of FIG. 1E, according to one example embodiment of the present disclosure. As shown, the software architecture 104 includes several software modules within the smart network host device 120. Programming instructions stored within the processor complex 160 implement a portion of the system software architecture 104 that includes a runtime server 180, a product solution space 190 and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186 and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 1G:
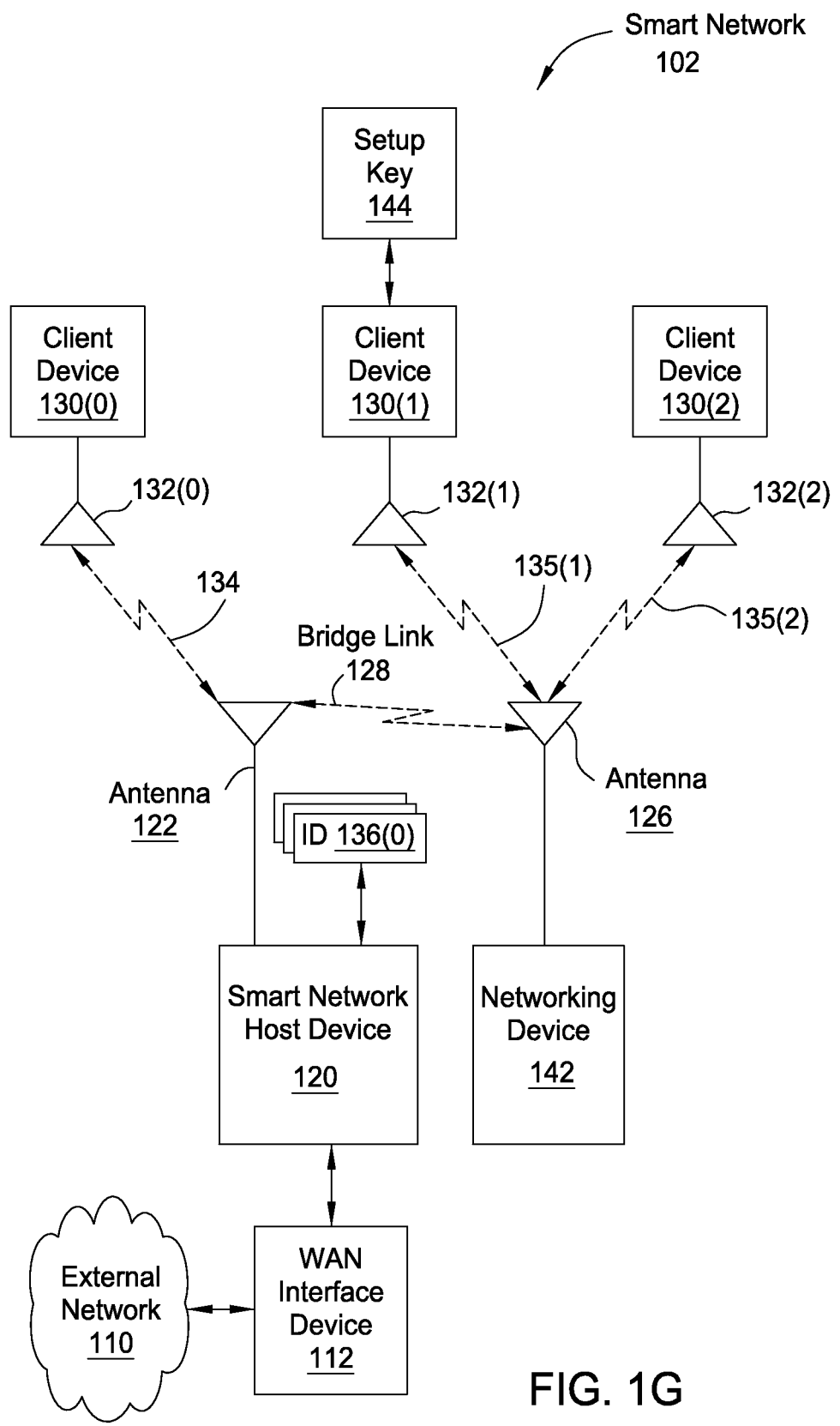
FIG. 1G illustrates the smart home network of FIG. 1A, according to another example embodiment presented in this disclosure.

FIG. 1G illustrates the smart network of FIG. 1A, according to another example embodiment of the present disclosure. Here, the smart network 102 includes the smart network host device 120, networking device 142, one or more client devices 130 and a wide area network (WAN) interface device 112, coupled to the external network 110 of FIG. 1A. The WAN interface device 112, smart network host device 120 and client devices 130(0) through 130(2) are configured to operate as previously described in FIG. 1A-1E.

In one embodiment, the networking device 142 allows authenticated clients (e.g., client devices 130(1) and 130(2)) to access the smart network 102 over a respective wireless client link 135(1), 135(2). The networking device 142 may be any device providing wireless connectivity to the external network 110. For example, the networking device 142 may be a wireless router or wireless access point. As shown, the networking device 142 includes an antenna 126 used to transmit and receive radio transmissions of network frames from client devices 130 and smart network host device 120. In this example, the networking device 142 has established a bridge link 128 with the smart network host device 120. Network data transmitted by one of the client devices 130 destined for the external network 110 is received by the networking device 142 and retransmitted via bridge links 128 to the smart network host device 120. The smart network host device 120 then forwards the network data to the external network 110. Similarly, data packets from the external network 110 with a destination address of one of the client devices 130 are transmitted via bridge link 128 to the networking device 142, which retransmits the data packets via one of the wireless client links to the appropriate client device 130.

Depending on the embodiment, the smart network host device 120 may act as a registrar or wireless local area network (WLAN) manager for the client devices 130. The networking device 142 may communicate with the smart network host device 120 to determine whether the client devices 130 are authorized to access the smart network 102. If the device is authorized, then the access point allows that client device 130 to join the smart network 102 and may begin forwarding network frames to from the client device 130.

Although embodiments are described herein with reference to the networking device 142 operating within the smart network 102, other environments are broadly contemplated. For example, in an alternative embodiment, the networking device 142 operates outside of and/or in the absence of the smart network 102. As an example, the networking device 142 may connect to an external network via a network link, providing access to the external network to one or more connected client devices 130.

Figure 1H:
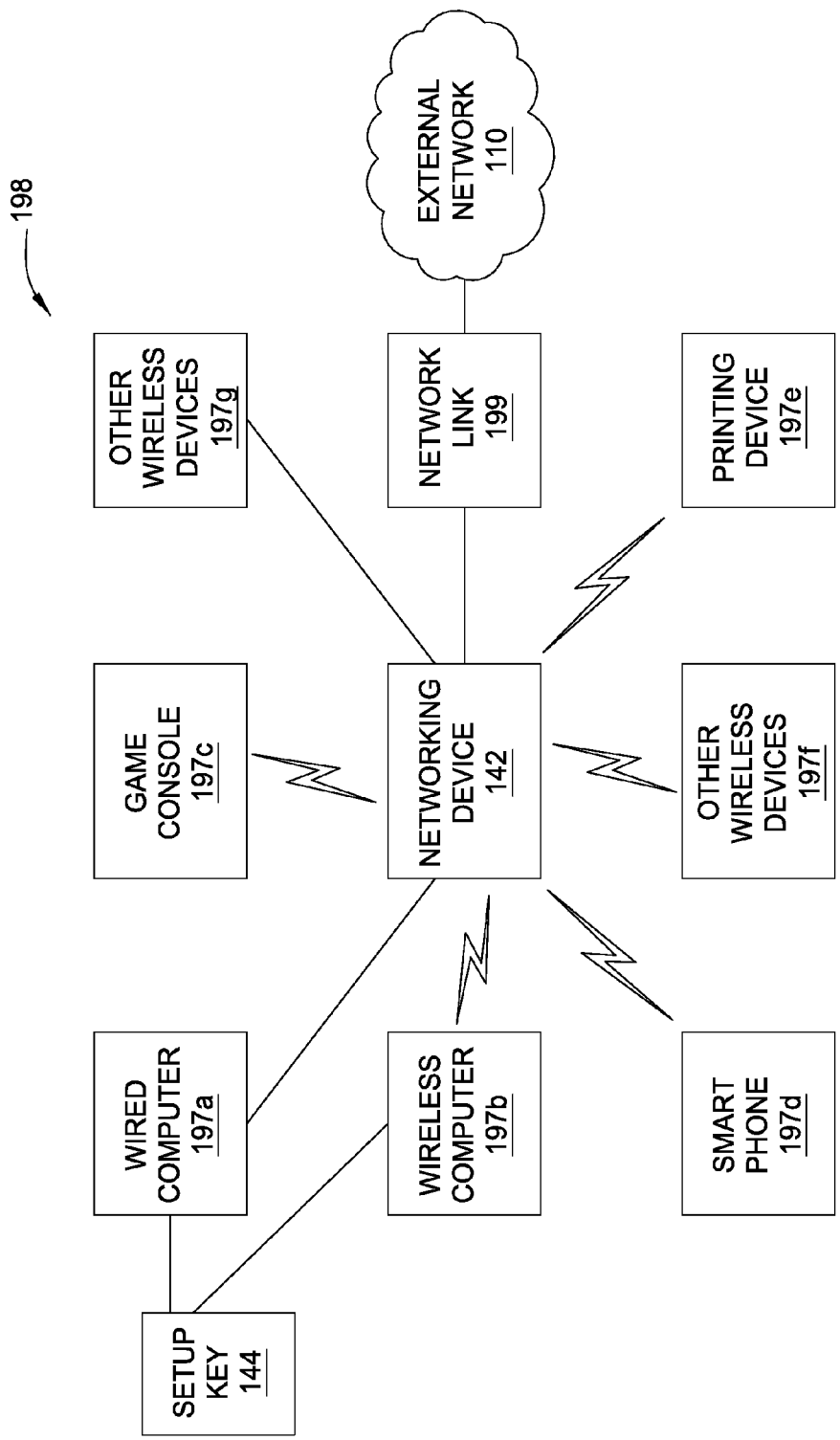
FIG. 1H illustrates a network that includes a networking device of FIG. 1G, according to an example embodiment presented in this disclosure.

FIG. 1H illustrates a network 198 that includes the networking device 142 of FIG. 1G, according to an example embodiment of the present disclosure. The networking device 142 is connected to multiple client devices 130, which include a wired computer 197*a*, a wireless computer 197*b*, a game console 197*c*, a smart phone 197*d* and a printing device 197. Each client device 130 may be hardwired or wirelessly connected to the networking device 142. The client devices 130 may also include other wireless devices 197*f* and other wired devices 197*g*. The networking device 142 may also facilitate communication with other private or public networks outside of the network 198, such as the external network 110. A network link 199 may be configured to connect the networking device 142 to the external network 110. In one embodiment, the external network 110 is the Internet, and the network link 199 is an Internet link provided using a telephone modem, a Digital Subscriber Line (DSL) modem, a cable modem, an optical modem, etc.

In one embodiment, a vendor of the networking device 142 provides the setup key 144 in conjunction with the networking device 142. The setup key 144 facilitates configuring the networking device 142 for use in the network 198. More specifically, the setup key 144 facilitates interconnecting wireless and/or hardwired computers and other electronic devices through the networking device 142, such that packets of data can be securely exchanged by the networked devices. To this end, the setup key 140 may provide a client device, such as the wireless computer 197*b*, a network application containing executable instructions. When executed, the instructions cause the wireless computer 197*b* to perform an operation for automatically configuring the networking device 142 to securely communicate wirelessly with the wireless computer 197*b*. Automatically configuring the networking device 142 refers to configuring the networking device 142 without requiring a user to provide any configuration or network settings for the networking device 142.

In one embodiment, the network application may store configuration settings of the configured networking device 142 on the setup key 144. Doing so allows additional client devices to be securely connected to the networking device 142 by providing the setup key 144 to the additional client devices. The networking device 142 may also provide a user interface for modifying the configuration settings for the networking device 142. Depending on the embodiment, the user interface may be accessed via a web browser application or via an administrative tool component installed on the computer 197*b* from the setup key 144. In one embodiment, the networking device is configured to authenticate a user to access the user interface, without requiring the user to specify a password.

In some embodiments, the user is authenticated based on a digital certificate stored on the setup key. That is, the user is authenticated on the basis of something they have (the setup key 144) instead of something they know (a password). The administrative tool may provide the digital certificate to the networking device 142 during a Secure Sockets Layer (SSL)/Transport Layer Security (TLS) handshake between the administrative tool component and the networking device 142. In other embodiments, the network application or the administrative tool component imports the digital certificate into a browser application of the client device, and the browser application provides the digital certificate to the networking device 142 during an SSL/TLS handshake between the browser application and the networking device 142. Generation of the digital certificate and/or authentication of the user may occur based on a predetermined security policy. Depending on the embodiment, the digital certificate may be pre-generated and stored on the setup key 144. In other words, the digital certificate may exist on the setup key 144 prior to connecting the setup key 144 to any client device. In other embodiments, the digital certificate is generated by the network application and/or administrative tool component subsequent to connecting the setup key to a client device.

Advantageously, at least in some cases, the setup key simplifies the process for a user to configure a secure wireless network and configure client devices to connect to the secure wireless network. Additionally, the user may the user may access a user interface using the setup key 144. Wireless networks are often desirable because computers and other electronic devices can be easily moved and positioned throughout a home or small business while retaining network connectivity. Incorporating wireless communication also helps to reduce the need for running cables. Secure wireless networks are often desirable due to a reduced susceptibility to security breaches, as compared to unsecured wireless networks. By using the techniques disclosed herein, the user may more conveniently and/or efficiently configure a wireless network with appropriate security settings, relative to alternative approaches.

One alternative approach may require the user to input one or more configuration parameters, such as: an Internet Protocol (IP) address of the networking device 142 (e.g., 192.168.0.1, etc.), a predetermined administrative username and password, a service set identifier (SSID), a network password, and a media access control (MAC) address. The SSID, also referred to as a network name or network identifier, refers to a character sequence that identifies a wireless LAN and that may be up to thirty-two characters in length. The network password may also be referred to as a security key or passphrase. The MAC address refers to a unique identifier assigned to a network adapter or network interface card, often referred to as a physical address.

Further, networking devices are often preconfigured as an open access point with no encryption and with a published SSID, allowing any device to access the wireless network provided by the access point, as well as attempt to access devices (whether authorized or not) connected to the access point. To properly secure the networking devices, the user may be required to select a wireless security protocol such as, for example, Wired Equivalent Privacy (WEP) encryption or Wi-Fi Protected Access (WPA and WPA2) encryption. The user may also be required to specify one or more options for a selected wireless security protocol, such as a desired WEP key length. Further, the user may also be required to specify some of the configuration parameters when adding additional devices to the network. By using the techniques disclosed herein, rather than the alternative approaches, the user is no longer required to specify any of the configuration parameters.

FIG. 2 is a block diagram illustrating components of the client device 130 of FIG. 1G, according to an example embodiment of the present disclosure. As shown, the client device 130 includes a processor 210 connected to a memory 220, a USB port 230, an Ethernet adapter 240, a wireless network adapter 250, and an optical disk drive 260. The client device 130 may be connected connect to a display screen and input devices such as, for example, a keyboard, a touch screen, a mouse, a touchpad, a trackball, audio input devices, and the like. The Ethernet adapter 240 enables the client device 130 to physically connect to a network by a wire such as an Ethernet cable. The wireless network adapter 250 may include suitable transmitting and receiving components, such as transceivers, for wirelessly communicating with a local network. Both Ethernet adapter 240 and wireless network adapter 250 may be configured to communicate with a network, such as the network 198 of FIG. 1H, using suitable communications protocols such as, for example, Internet Protocol Suite (TCP/IP). The client device 130 is shown with both the Ethernet adapter 240 and the wireless network adapter 250 for illustrative purposes only. While one or both hardwire and wireless adapter may be installed inside the client device 130 or externally connected to the client device 130, merely one is sufficient to enable the client device 130 to connect to a network.

Other electronic devices added to the network 198 may have some of the components as described with reference to the client device 130 of FIG. 2. The components of such devices may be configured to achieve the intended purposes of the particular electronic device, which may or may not differ from the client device 130 of FIG. 2. In addition, other electronic devices may have a different combination of components such as, for example, a printing device without an optical disc drive.

FIG. 3 is a block diagram illustrating components of the networking device 142 of FIG. 1G, according to an example embodiment of the present disclosure. As shown, the networking device 142 includes a processor 310 operatively connected to a bus 330 that provides access to a memory 320. The processor 310 may also be operatively connected to a wireless adapter 350 having suitable transmitting and receiving components, such as transceivers, for wirelessly communicating with local networked devices. Ethernet adapter 340 may also provide wired ports 342 for providing a hardwire connection between client devices 130 and the networking device 142. An Internet port 344 allows the router 300 to connect to an Internet link, such as a modem, which communicates with private or public networks through, for example, Internet Service Providers (ISPs), Internet servers with dedicated bandwidth, switches, gateways, other routers or any other device used to achieve electronic communication between the networking device 142 and another network.

FIG. 4 is a block diagram illustrating components of the setup key 144 of FIG. 1G, according to an example embodiment of the present disclosure. As shown, the setup key 144 includes a storage medium 400 capable of storing data and executable code. For instance, the storage medium 400 may be a USB flash memory (USB key), a compact disc (CD). For example, in some embodiments, multiple setup keys may be used to configure a network. In one embodiment, e.g., a CD may be used initially to configure a network to include the networking device and a first client device, and a USB key is used to store configuration settings for adding additional client devices to the configured network. In another embodiment, an application stored on the USB key may be used to initially configure a network and to store configuration settings for the configured network. The USB key may then be used to add additional client devices to the configured network.

As shown, the storage medium 400 includes configuration settings 410, a digital certificate 460 and a network application 420. The network application 420 may include a setup component 430, an administrative tool component 440, and a connect computer component 450. The network application 420 may be written in any number of programming languages capable of performing operations necessary to implement an embodiment of the present disclosure. The configuration settings 410 may be encoded using, for example, an Extensible Markup Language (XML) grammar.

In one embodiment, the configuration settings 410 include a mode element indicating a state of the storage medium 400 and an appropriate execution mode for the network application 420. The execution mode may be a connect mode or a tool mode. The connect mode indicates that a user desires to add a client device to a network, and the tool mode indicates that a user desires to modify configuration settings of a configured network. For the connect mode, the configuration settings 410 may further include a count of client devices previously configured to connect to the network. The count may be incremented each time a client device is successfully configured.

As an example, if the count of configured client devices is zero, then the network application 420 may execute the setup component 430 to configure the networking device 142. If the count of client devices is greater than zero, then the network application 420 bypasses execution of the setup component 430 and proceeds directly to executing the connect computer component 450. In some embodiments, two separate counts are stored—one for wired client devices and one for wireless client devices.

In an alternative embodiment, the configuration settings 410 and/or network application 420, or selected components thereof, may be provisioned in another component such as a wireless network adapter, which could be provided to a client device 130 to be configured to access the network 198. In yet another embodiment, the configuration settings 410 and/or the network application 420, or selected components thereof, could be received or downloaded from a web server and stored onto the setup key 144 or onto the client device 130.

In one embodiment, the network application 420 and the configuration settings file 410 may guide a user to securely configure a local area network (LAN) having the networking device 142 and a first client device 130 with either a wireless or hardwired connection. In one embodiment, this configuration may be accomplished without requiring the user specify any configuration settings for the networking device 142 and/or the first client device 130, such as an SSID, a network password, a wireless security protocol, an administrative username, an administrative password, etc. In one embodiment, the setup component 430 discovers a networking device 142 configured with factory default settings. The factory default settings may include an SSID conforming to a predetermined format, such as containing a predefined character sequence. For instance, the predetermined format may include a predefined character sequence of "CISCO" followed by a 5-digit number.

In one embodiment, once the networking device 142 is discovered, the setup component 430 then proceeds to configure the networking device 142 and the first client device 130. Depending on the embodiment, the setup component 430 may also configure the networking device 142 with a wide area network (WAN) connection. Once the networking device 142 and the first client device 130 have been configured, the setup component 430 updates the configuration settings file 410 to reflect the configuration settings used in configuring the networking device 142. The setup component 430 may also update the configuration settings file 410 to indicate that the networking device 142 and the first client device 130 have been configured. The connect computer component 450 may then be executed on additional client devices to configure the additional client devices to communicate with the router via either a wireless or hardwire connection and using the updated configuration settings file 410.

In one embodiment, a user may subsequently desire to configure the networking device 142 via a user interface for modifying configuration settings of the networking device 142. In some embodiments, the user may access the user interface via a web browser application (e.g., by visiting an IP address of the networking device, such as 192.168.0.1). In other embodiments, the user interface may be provided by the administrative tool component 440, which is installed on a client device 130.

In one embodiment, the networking device 142 may be configured to authenticate the user to access the user interface, based on the digital certificate 460, without requiring the user to supply a password. To this end, the digital certificate 460 may be provided to the networking device 142 by the networking application 420 or administrative tool component 440 executing on the client device 130. The digital certificate 460 may be provided to the networking device 142 during an SSL/TLS handshake with the networking device 142. If the user interface is accessible by the web browser application, the network application 150 may copy the digital certificate 460 to the client device 130 and import the digital certificate 460 into the web browser application. Accordingly, the user may access the user interface via the web browser application without having to specify any username or password. In some embodiments, the digital certificate may be generated by the network application 420 based on a predetermined security policy. In other embodiments, a separate application generates the digital certificate and stores the digital certificate on the storage medium 400, prior to the network application first being executed.

Alternatively, the storage medium 400 may be a read-only medium such as a CD or DVD. In such a case, the storage medium 400 may be manufactured such that the configuration settings 410 includes the digital certificate and configuration settings such as a network password, a network identifier, and an administrative password. The configuration settings stored on the medium are distinct from factory default configuration settings of a networking device 142. Further configuration settings and/or digital certificate may be different for each copy of the storage medium 400. Thus, the storage medium 400 need not be updated with the digital certificate or any of the configuration settings.

Figure 5:
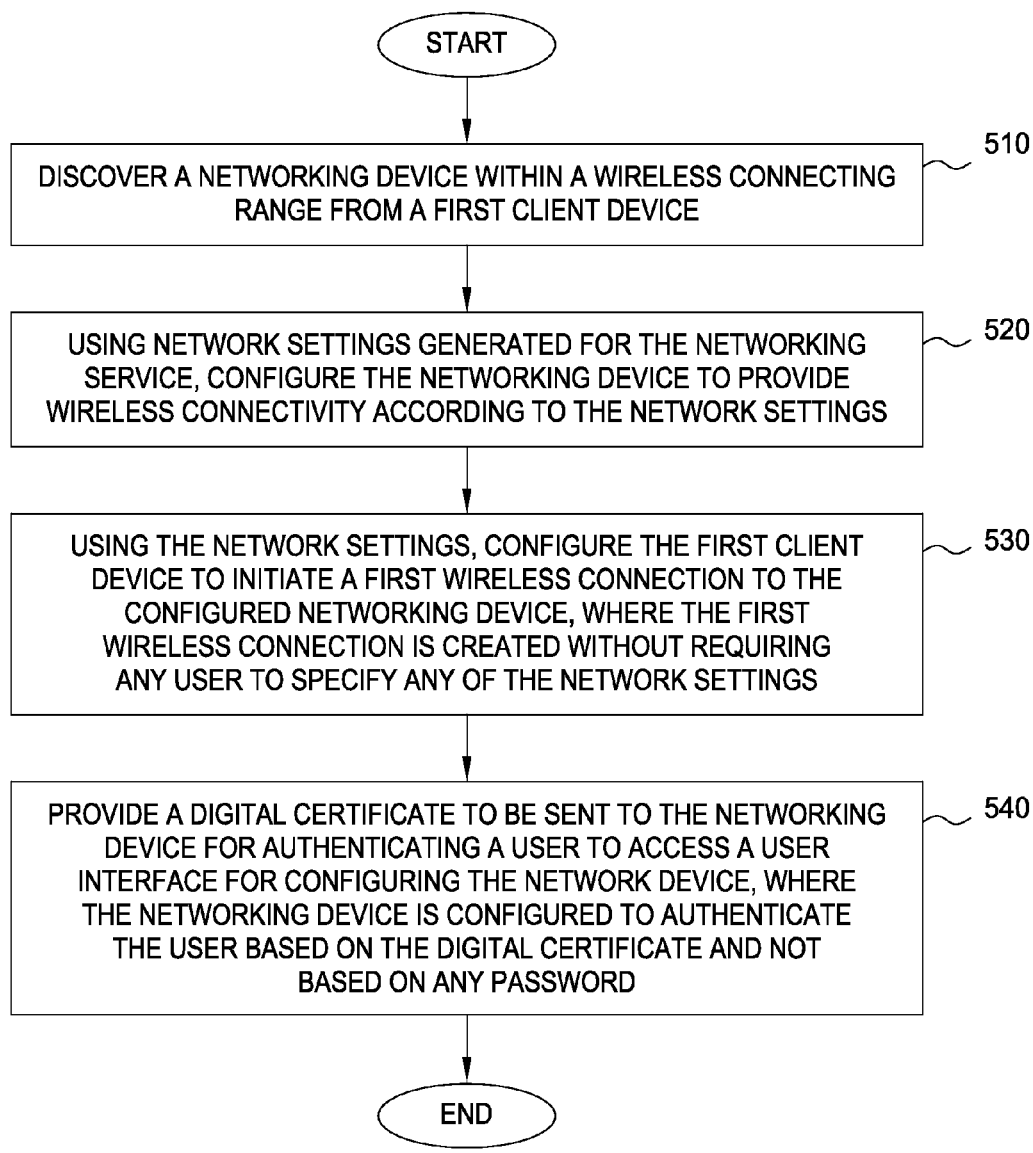
FIG. 5 is a flowchart depicting a method for configuring a secure wireless network, according to an example embodiment presented in this disclosure.

FIG. 5 is a flowchart depicting a method 500 for configuring a secure wireless network, according to one embodiment of the present disclosure. As shown, the method 500 begins at step 510, where the network application 420 discovers a networking device within a wireless connectivity range from a first client device. The step 510 may occur when a user connects the setup key 144 to the first client device, allowing the first client device to retrieve and execute the network application 420 stored on the setup key 144. In certain embodiments, the network application 420 may be automatically launched, such as, for example, using autorun software technology provided by the Microsoft Windows XP operating system. In other embodiments, the user may be prompted to whether to launch the network application 420.

At step 520, the network application 420 uses network settings generated for the networking device 142 to configure that networking device 142 according to the network settings. For example, the network application 420 may use the configuration settings to specify a default SSID, wireless security protocols and/or a default network password used by a client to access the wireless network being configured. The wireless adapter of the client may be identified using a search for available network adapters on the client device. The search may be accomplished via one or more application programming interfaces (APIs) provided by the operating system executing on the client device.

In some embodiments, if a wireless adapter is detected that is not enabled, the network application 420 may automatically enable the wireless adapter. Enabling the wireless adapter may also be accomplished via one or more operating system APIs. If no wireless adapter is found, the network application 420 may attempt connect to the networking device 142 via a wired port. To this end, the network application 420 may first instruct the user to connect the networking device 142 and the client device 130 using an Ethernet cable. The network application 420 may then search for an available Ethernet adapter. If an Ethernet adapter is identified, the network application 420 determines whether the Ethernet adapter is enabled. If not, the network application 420 may automatically enable the Ethernet adapter. The network application 420 may also command the Ethernet adapter to perform a Dynamic Host Configuration Protocol (DHCP) release/renew. The network application 420 may then connect to the networking device 142 via the identified Ethernet adapter.

In one embodiment, after the network application 420 connects to the networking device 142, the network application 420 gains administrative access to the networking device 142 via a default administrative username and a default administrative password. In an alternative embodiment, the network application 420 gains administrative access to the networking device 142 via the digital certificate 460 stored in the setup key 144.

In one embodiment, after gaining administrative access, the network application 420 configures the network device 142 using the network settings, which may include an SSID, a network password, a wireless security protocol and the like. The configuration of the networking device 142 may be accomplished using one or more APIs provided by the networking device 142. Some or all of the network settings may be automatically generated using a random generation algorithm. For example, the SSID could be a human readable string including an adjective and a noun such as, for example "ShortWillow" along with an appended numeric value (e.g., a portion of a serial number of the set up key). Further, the network settings may specify to enable a wireless security protocol, such as WPA. By configuring the networking device 142 with the generated network settings, the wireless security associated with the network 198 may be improved, without requiring the user to provide any of the network settings or understand the details of configuring a wireless network with wireless security protocols.

At step 530, the network application 420 uses the network settings to configure the first client device to initiate a first wireless connection to the configured networking device. The first wireless connection is created without requiring the user to specify any of the network settings. For example, the first client device may be configured to initiate the first wireless connection using the SSID, generated password, and specified wireless security protocol generated as part of step 520.

At step 540, the network application 420 provides a digital certificate 460 to send to the networking device for authenticating the user to access a user interface for configuring the networking device. The networking device is configured to authenticate the user based on the digital certificate. Once authenticated, the user may modify any configuration settings of the networking device 142, such as SSID, network password, wireless security protocol, parental controls, guest access, etc. After the step 540, the method 500 terminates.

As described above, in one embodiment, a predetermined security policy may specify how users are authenticated to access the user interface for configuring the networking device. The predetermined security policy may also specify how digital certificates are generated. In one embodiment, the security policy specifies that each certificate conforms to the X.509 specification, which defines a standard format for public key infrastructure (PKI) certificates. The digital certificate for authenticating the user may also referred to as a client certificate. In some embodiments, the security policy also specifies to perform server validation. In other words, the networking device 142 sends a server certificate to the network application 420, which authenticates the networking device 142 based on the server certificate. The security policy also specifies that a socket connection is immediately terminated on failure to validate a certificate. The security policy also specifies that the Hypertext Transfer Protocol Secure (HTTPS) protocol is used for control connections. The security policy also specifies that the HTTPS protocol may be used for data connections. For example, suppose that the security policy is applied in a context of a digital photo service. The request for the service to provide a digital photo may occur over an HTTPS connection, and the service may return a Uniform Resource Locator (URL) of the digital photo. The digital photo may then be retrieved via an HTTP connection and using the URL.

In some embodiments, the security policy further imposes one or more additional certificate generation and/or authentication constraints. The additional constraints may include a security protocol, cryptographic hash function type, a cryptographic mode of operation, an encryption standard, a certificate compatibility constraint, a certificate container type, a certificate format, a key container type, a key format, a cryptographic algorithm for digital signatures, a key size, a time duration during which certificates are valid, and a time duration during which certificate revocation lists (CRLs) are valid. Values assigned to each constraint may be tailored to suit the needs of a particular case. In one exemplary embodiment, the values for each constraint are assigned as follows:

TABLE I

Example constraints specified by the security policy

Security protocol - Transport Layer Security (TLS) version 1.2
Cryptographic hash function type - Secure Hash Algorithm 1 (SHA-1)
Cryptographic mode of operation - Cipher-block chaining (CBC) mode for ciphers
Encryption standard - Advanced Encryption Standard 128 (AES-128) as cipher
Certificate compatibility constraint - Certificates are RSA-compatible
Certificate container type - Privacy Enhanced Mail (PEM) containers
Certificate format - Use public-key cryptography standards (PKCS) formats
Key container type - Privacy Enhanced Mail (PEM) containers
Key format - Use public-key cryptography standards (PKCS) formats
Cryptographic algorithm for digital signatures - RSA algorithm
Key size - 1024 bits
Time duration during which certificates are valid - 10 years
Time duration during which certificate revocation lists are valid - 10 years The constraints in the above table may be used to configure a cryptography tool. The cryptography tool refers to an application for generating digital certificates and/or key pairs. Exemplary security tools include Open Secure Sockets Layer (OpenSSL) and GNU Transport Layer Security Library (GnuTLS), which implement the SSL/TLS protocols. The constraints may be stored in a preferences file associated with the cryptography tool.

In one embodiment, the vendor of a device generates a digital certificate for each device, where the device is the networking device 142 or the setup key 144. In other words, the vendor may serve as a Certificate Authority (CA) for the digital certificates. A CA refers to an entity that issues digital certificates. At least in some embodiments, the vendor serves as a root CA for the digital certificates. A root CA refers to an entity at which a chain of trust of each digital certificate begins. The root CA is associated with a self-signed digital certificate; in other words, the root CA uses its own private key to sign its own digital certificate, also referred to as a root certificate. The signature of the root CA is verified using the public key associated with the root CA. To establish the chain of trust, the networking device 142 and the setup key 144 each store, in its firmware, a copy of the root certificate. In one embodiment, the root certificate may be generated using the following commands:

TABLE II

Generating a root certificate

```
01  mkdir -p demoCA
02  od -N 8 -t x8 -A n /dev/random | sed -e 's/^ //' > demoCA/serial
03  touch demoCA/index.txt
04  echo '01 ' > demoCA/crlnumber
05  openssl genrsa -aes128 -out he_root_keys.pem 1024
06  openssl rsa -in he_root_keys.pem -pubout >> he_root_keys.pem
07  openssl req -new -key he_root_keys.pem -config openssl.cnf |
    openssl ca - extensions vs_ca -config openssl.cnf -keyfile
    he_root_keys.pem -selfsign -outdir . - startdate 700101000000Z -out
    he_root_cert.pem
08  openssl x509 -in he_root_cert.pem -text -noout
```

In the above table, lines 01-04 configure a directory structure for use by the cryptography tool. Line 05 invokes the cryptography tool to generate a private key for the root CA, based on the constraints specified by the security policy. Line 06 invokes the cryptography tool to generate a public key for the root CA, based on the constraints specified by the security policy. Line 07 generates a self-signed root certificate for the root CA, based on the constraints specified by the security policy. The constraints may be specified as a command line argument and/or in a default configuration file associated with the cryptography tool, e.g., "openssl.cnf." The root certificate is stored in a file "he_root_keys.pem." Line 08 may optionally be executed to display the contents of the root certificate.

In one embodiment, each device may have an associated digital certificate that is signed by the root CA using the root certificate. The security policy may also specify constraints on one or more fields of each certificate. For example, the security policy may specify a constraint on a NotBefore field in a Validity section of each certificate. The constraint may specify that the NotBefore field is set to match the date of "Jan. 1 00:00:00 1970 GMT." The security policy may also specify constraints on the Distinguished Name (DN) fields, which include fields such as Common Name, Organization, Organizational Unit, Locality, State or Province, and Country/Region. The security policy specifies that the Common Name field of test certificates is appended to include a predefined character sequence, "(test)." The security policy also specifies that the root certificate has a Common Name field storing "HE Root CA." In the Common Name field of the root certificate, HE stands for Home Ecosystem, and Root CA specifies that the certificate is a root certificate.

In some embodiments, the digital certificate may have an associated type that is selected from a device certificate, a service certificate, and a firmware certificate. Although embodiments are herein described with reference to the digital certificates of each networking device 142 and/or setup key 144 being device certificates, it is contemplated that any digital certificate type may be used in other embodiments. In one embodiment, the security policy specifies that a device certificate has a Common Name field storing "HE Device <model name> <model ID> <model version>." In the Common Name field of the device certificate, HE stands for Home Ecosystem, <model name> is a device name assigned by the vendor of the device, <model ID> is a device identifier assigned by the vendor and <model version> is a device version number assigned by the vendor.

In one embodiment, the security policy also specifies that a service certificate has a Common Name field storing "HE Service <service name> <service ID> <service version>." In the Common Name field of the service certificate, <service name> is a service name assigned by the vendor, <service ID> is a service identifier assigned by the vendor and <service version> is a service version number assigned by the vendor.

In one embodiment, the security policy also specifies that a firmware certificate has a Common Name field storing "HE Firmware <firmware name> <firmware ID> <firmware version>." In the Common Name field of the firmware certificate, <firmware name> is a firmware name assigned by the vendor, <firmware ID> is a firmware identifier assigned by the vendor and <firmware version> is a firmware version number assigned by the vendor.

In one embodiment, each device may store the private key associated with the public key identified in the device certificate, which are generated using the cryptography tool based on the constraints defined by the security policy. The device may be any given networking device 142 or setup key 144. Although such a device certificate includes a public key associated with the respective device, in some embodiments, a copy of the public key may also be separately stored outside of the device certificate. At least in some embodiments, the device certificates and/or private keys are generated by the vendor during or subsequent to manufacturing the respective device. In one embodiment, the device certificate may be generated using the following commands:

TABLE II

Generating a device certificate 01  openssl genrsa -aes128 -out he_device_keys.pem 1024
02  openssl rsa -in he_device_keys.pem -pubout >> he_device_keys.pem
03  openssl req -new -key he_device_keys.pem -config openssl.cnf -out request.pem
04  openssl ca -in request.pem -extensions v3_req -config openssl.cnf -keyfile he_root_keys.pem -cert he_root_cert.pem -outdir . -startdate 700101000000Z -out he_device_cert.pem
06  openssl x509 -in he_device_cert.pem -text -noout In the above table, lines 01-02 invoke the cryptography tool to generate a public/private key pair for the device, based on the security policy. Lines 03-05 invoke the cryptography tool to generate a device certificate based on the security policy. Line 06 may optionally be executed to display the contents of the device certificate.

Figure 6:
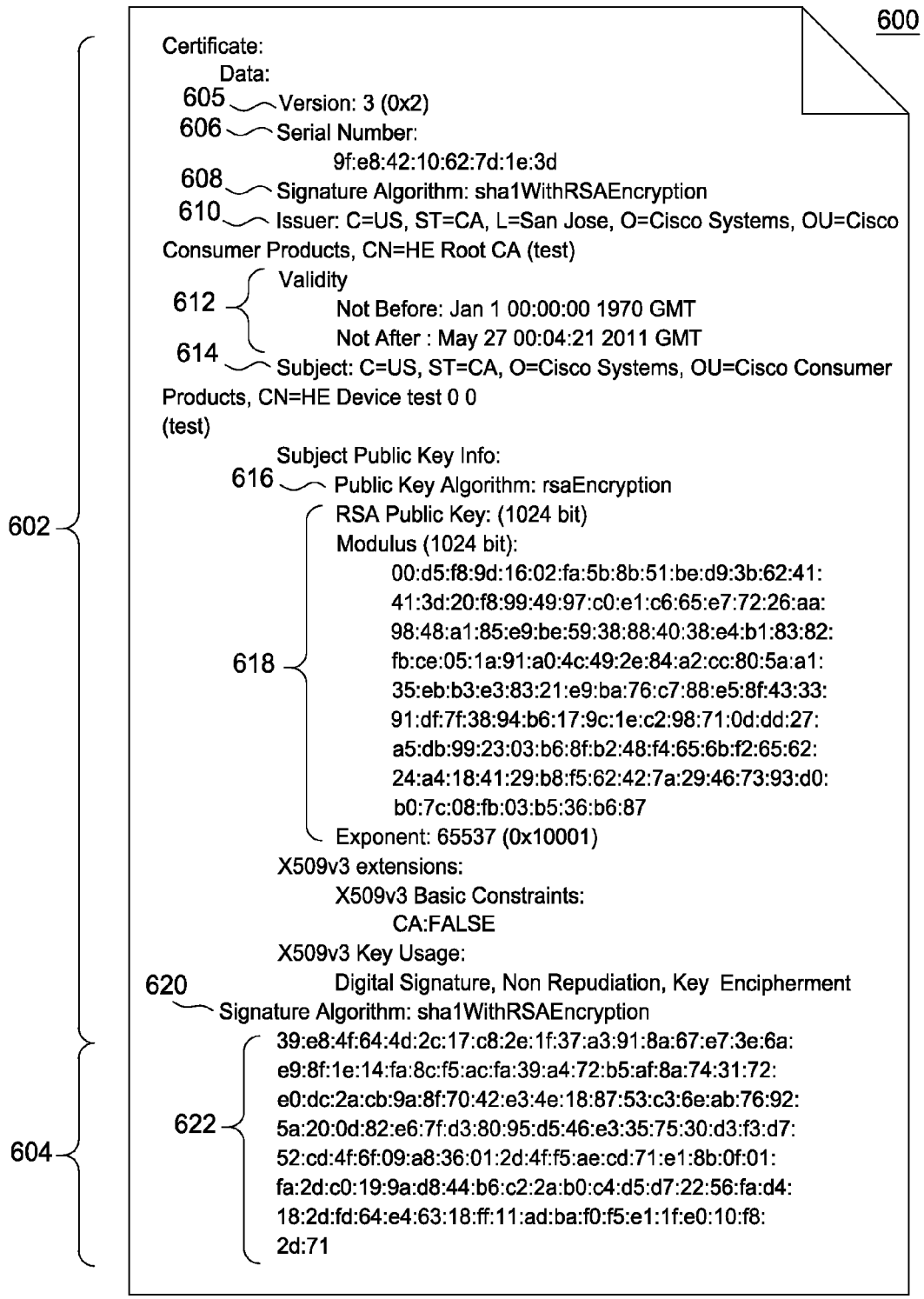
FIG. 6 illustrates a device certificate for a device, according to an example embodiment presented in this disclosure.

FIG. 6 illustrates a device certificate 600 for a device, according to an example embodiment of the present disclosure. The device certificate 600 corresponds to the contents of the device certificate generated from the commands of Table II. As shown, the device certificate 600 includes a data portion 602 and a signature portion 604. The data portion 602 includes a version 605 of the X.509 standard that the device certificate 600 conforms to, a serial number 606 for the device certificate 600, a cryptographic hash function 608 used for signatures of the device, DN fields 610 identifying an issuer of the device certificate 600, a validity period 612 for the device certificate 600, DN fields 614 identifying the device, a public key encryption algorithm 616 used by the device, and a public key 618 of the device.

In one embodiment, the signature portion 604 of the device certificate 600 includes a cryptographic hash function 620 used for signatures of the CA and a signature 622 of the CA. The signature 622 of the CA is generated by encrypting, using a private key of the CA, a hash computed from the data portion 602 using the cryptographic hash function 620. The DN fields 610 and the validity period 612 satisfy the constraints specified by the security policy. In order to authenticate a user for accessing a user interface for configuring the networking device 142, device certificates are verified during an SSL/TLS handshake.

Figure 7:
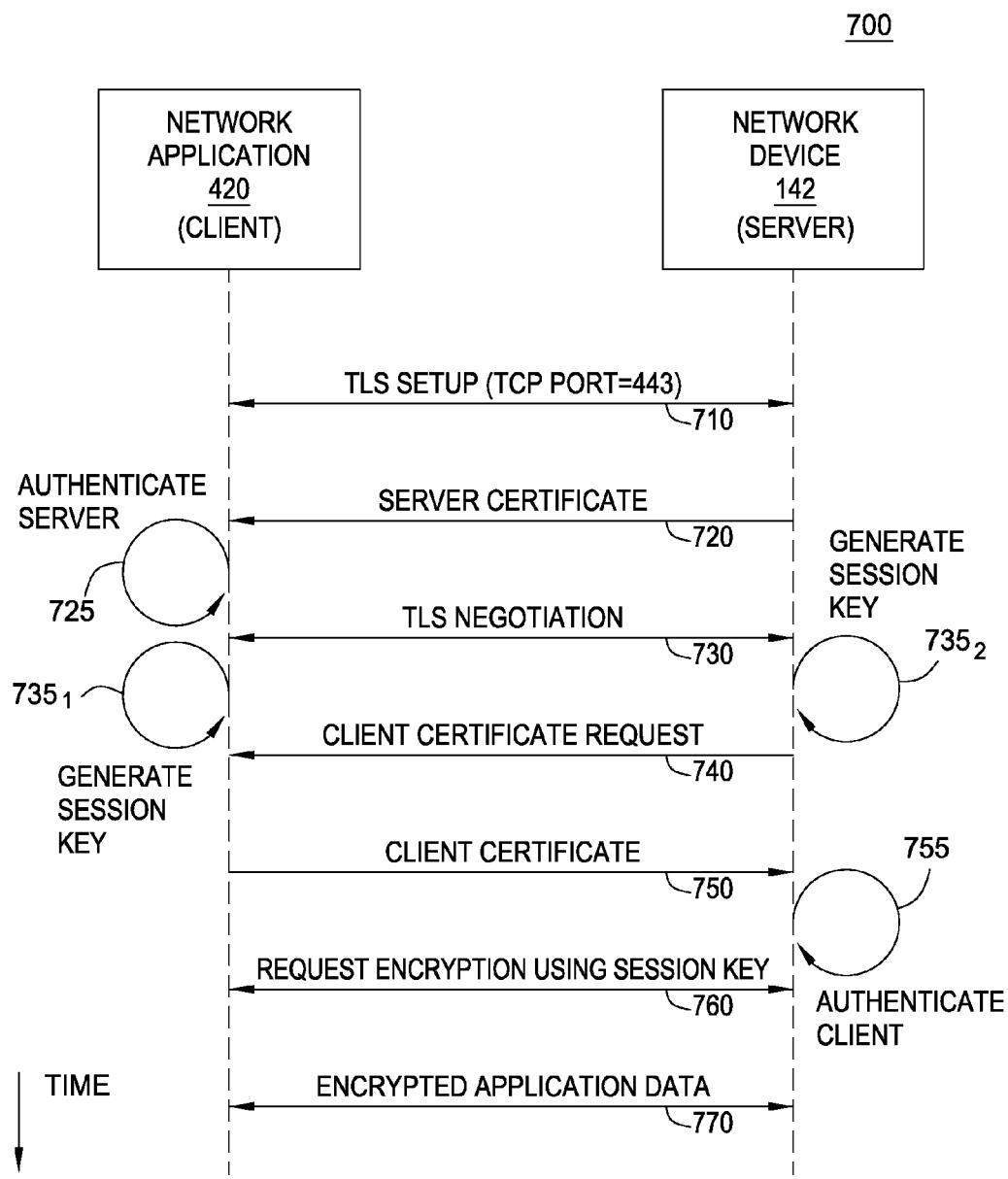
FIG. 7 is a sequence diagram depicting interactions between two actors during an SSL/TLS handshake, according to an example embodiment presented in this disclosure.

FIG. 7 is a sequence diagram 700 depicting interactions between two actors during an SSL/TLS handshake, according to an example embodiment of the present disclosure. The interactions may be implemented using any library that supports certificate validation using SSL/TLS. For example, the LibCurl library may be used in conjunction with OpenSSL or GnuTLS. As shown, the actors include the network application 420 provided by the setup key 144 and the networking device 142. In the context of the SSL/TLS handshake, the network application 420 acts as a client, and the networking device 142 acts as a server. At step 710, the actors perform a setup operation by communicating via a predefined port, such as TCP port 443. During the setup operation, the network application 420 sends a "client hello" message that includes cryptographic information such as the SSL/TLS version. The networking device 142 responds with a "server hello" message that contains a session identifier. At step 720, the networking device sends its associated device certificate to the network application 420. The device certificate may also be referred to as a server certificate.

At step 725, the network application 420 authenticates the networking device 142 based on the received server certificate. Authentication is further described below in conjunction with FIG. 8. At step 730, the actors perform a negotiation operation. During the negotiation operation, the network application 420 sends a random byte string that allows both the network application 420 and the networking device 142 to compute a session key to be used for encrypting subsequent message data, where the random byte string is encrypted using the public key of the networking device 142. The random byte string may also be referred to as a pre-master secret. The session key is computed by the actors at steps $735_1$, $735_2$, based on the pre-master secret.

At step 740, the networking device 142 sends a request for a client certificate. In response, at step 750, the network application 420 sends the client certificate to the networking device 142. At step 755, the networking device 142 authenticates the client 755 using the received client certificate. Authenticating the client 755 is further described below in conjunction with FIG. 8. Once the client and the server are both authenticated, the user of the network application 420 may gain access to the user interface for configuring the networking device 142. During user configuration of the networking device 142 via the user interface, the network application 420 and/or the networking device 142 may send and/or receive application data associated with configuring the networking device 142. Depending on the embodiment, the application data may be encrypted or unencrypted. At step 760, the actors communicate to request encryption using the generated session key. At step 770, the actors send and/or receive encrypted application data. Additionally or alternatively, the actors may send and/or receive unencrypted application data.

Figure 8:
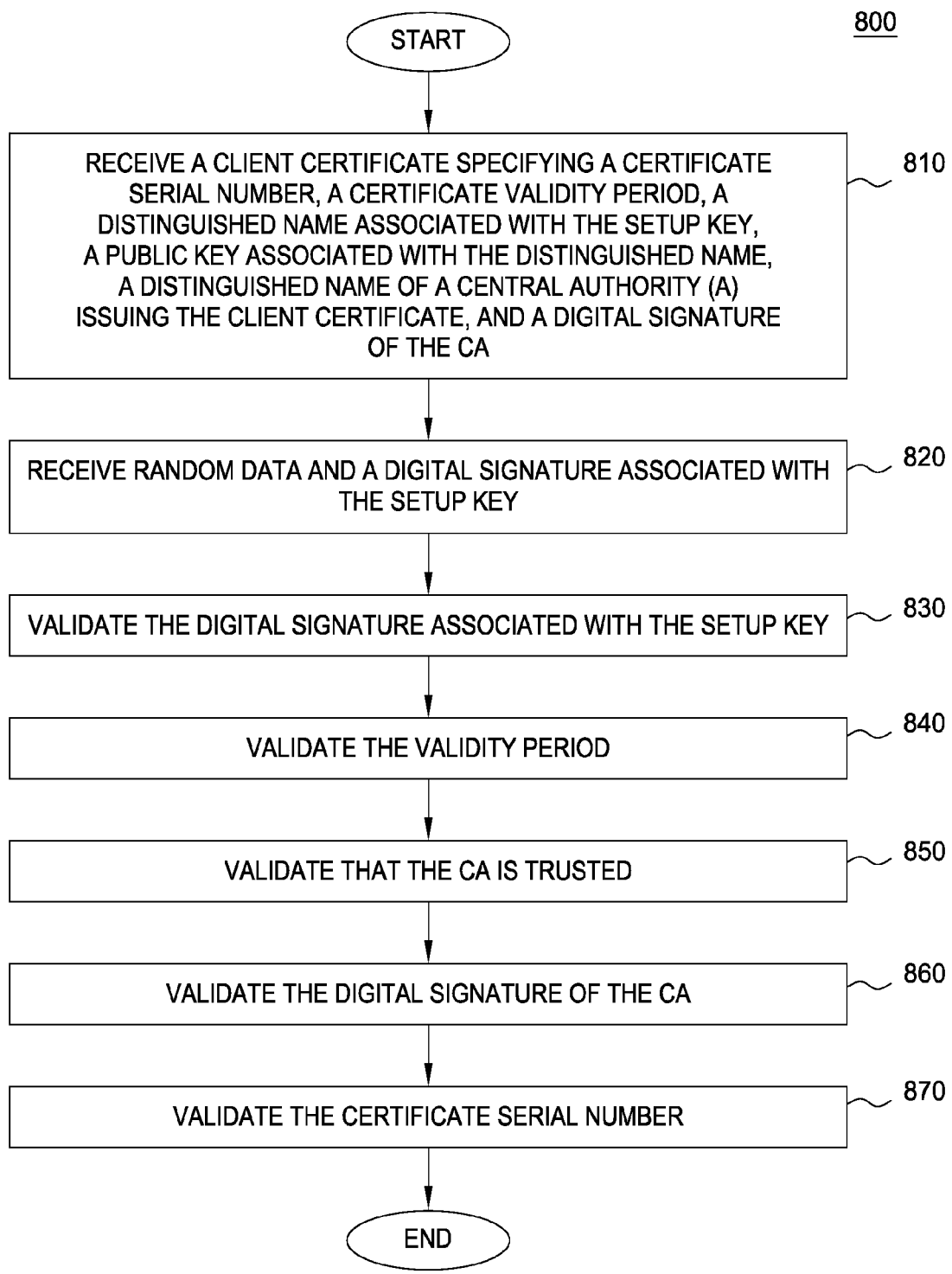
FIG. 8 is a flowchart depicting a method for authenticating a user based on a client certificate, according to an example embodiment presented in this disclosure.

FIG. 8 is a flowchart depicting a method 800 for authenticating a user based on a client certificate, according to an example embodiment of the present disclosure. Assume a user requests to access a user interface for configuring the networking device 142. In order to grant access to the user interface, the networking device 142 first authenticates the user by performing the method 800 during a TLS/SSL handshake. Doing so creates an encrypted communication channel between the client device and the networking device. The user may be authenticated by validating the client certificate. If the client certificate fails to validate, the user is denied access to the user interface. In some embodiments, the method 800 corresponds to the step 755 of FIG. 7.

At step 810, the networking device 142 receives a client certificate 420 from the network application 420 that is provided by the setup key 144. The network application 420 may be executed by a client device 130 to which the setup key 144 is connected. The client certificate serves to associate the setup key 144 with a public key. The client certificate includes information such as a serial number 606 for the client certificate, a validity period 612 for the client certificate, DN fields 614 associated with the setup key 144, a public key associated with the setup key 144, DN fields 610 associated with the CA issuing the client certificate, and a signature of the CA. The signature of the CA may be generated by encrypting, using a private key of the CA, a hash computed over the information included in the client certificate.

At step 820, the networking device 142 receives, from the network application 420, random data and a signature associated with the setup key 144. The signature is generated by encrypting the random data using a private key of the setup key 144. The networking device 142 then performs steps 830-860 to validate the received client certificate. In one embodiment, validation of the client certificate succeeds only when all steps 830-870 validate successfully.

At step 830, the networking device 142 validates the signature associated with the setup key 144. The signature may be validated by decrypting the signature using the public key associated with the setup key 144 and comparing the decrypted signature with the random data. If the decrypted signature matches the random data, then the signature is considered validated. At step 840, the networking device 142 validates the validity period in the client certificate. The validity period may be considered validated if the current time of the networking device 142 is within the validity period in the client certificate.

At step 850, the networking device 142 validates that the CA is trusted by comparing the DN fields of the CA with DN fields included in a copy of the root certificate stored on the networking device 142. If the DN fields match, then the CA is considered trusted. At step 860, the networking device 142 validates the signature of the CA by decrypting the signature of the CA using a public key of the CA, where the public key of the CA is obtained from the copy of the root certificate. If the decrypted signature matches the information included in the data portion of the client certificate, then the signature of the CA is considered validated.

At step 870, the networking device 142 validates the serial number for the client certificate based on a certificate revocation list (CRL) stored on the networking device 142. The CRL is maintained by the vendor of the networking device 142 and/or the setup key 144 and includes a list of revoked certificate serial numbers. A certificate may be revoked when a private key associated with the certificate is compromised. The CRL may be stored in a portion of the filesystem in the firmware of the networking device 142, where the portion is designated as a read-only portion that may only be updated during a firmware upgrade of the networking device 142. In one embodiment, the read-only portion is given by a predefined location, "/etc/certs/." If the serial number is not included in the CRL, then the serial number is considered validated. In some embodiments, the security policy may also specify predefined filenames for the CRL and/or certificates. For example, the security policy may specify that the CRL is named "he_crl.pem," the root certificate is named "he_root_cert.pem," the device certificate is named "he_device_cert.pem," and any combination of the root certificate and the CRL is named "he_ca.pm."

As described above, in one embodiment, if all steps 830-870 validate successfully, then the client is considered validated. Similarly, the client may also validate the server by performing variations of the steps 810-870, using the server certificate instead of the client certificate. Once the client and the server are both validated, then the networking device 142 grants access to the user interface for configuring the networking device 142. If the client or the server fails to be validated, the networking device 142 denies access to the user interface.

Advantageously, embodiments described above provide techniques for configuring a networking device to provide secure wireless connectivity to one or more client devices. One embodiment provides a setup key storing a network application. When a user connects the setup key to a client device, the client device executes the network application. The network application discovers and configures the networking device, using network settings generated for the networking device. Using the networking settings, the network application then configures the client device to initiate a first wireless connection to the configured networking device. The first wireless connection is created without requiring any user to specify any of the network settings. The network application may store the network settings onto the setup key. The user may then connect the setup key to other devices, to configure the other devices to initiate wireless connections to the configured networking device.

In one embodiment, the networking device is further configured to authenticate a user to access a user interface for configuring the networking device, where the user is not authenticated based on any password. In some embodiments, the user is authenticated based on a digital certificate received from the networking application, where the digital certificate is associated with the setup key. Advantageously, the user may configure a secure network more conveniently and/or efficiently at least in some cases. Should the user subsequently desire to further configure the networking device, the user may also more conveniently access the user interface for configuring the networking device.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A method, comprising:
    discovering a networking device within a wireless connectivity range from a first client device;
    upon determining that the networking device is configured with factory default settings, based on the networking device having a network identifier conforming to a predetermined format that includes a predefined character sequence contained in the network identifier, generating network settings for the networking device;
    configuring the networking device to provide wireless connectivity according to the network settings; and
    initiating, by the first client device and based on the network settings, a first wireless connection to the networking device, wherein the first wireless connection is initiated to request, on behalf of a user, access to a user interface for configuring the networking device, wherein the networking device is configured to, prior to granting access, authenticate the user requesting access.

2. The method of claim 1, wherein the user requesting access is authenticated based on a digital certificate.

3. The method of claim 2, wherein the digital certificate comprises an X.509 client certificate generated based on a predetermined security policy, wherein the first wireless connection is created without requiring user specification of any of the network settings, and wherein the user is not authenticated based on any password.

4. The method of claim 1, wherein the network settings specify a network identifier, a network password, and a wireless security protocol.

5. The method of claim 1, further comprising:
    initiating, by a second client device and based on the network settings, a second wireless connection to the networking device, without requiring the user to specify any of the network settings.

6. Logic encoded in one or more tangible media for execution and when executed operable to:
    discover a networking device within a wireless connectivity range from a first client device;
    upon determining that the networking device is configured with factory default settings, based on the networking device having a network identifier conforming to a predetermined format that includes a predefined character sequence contained in the network identifier, generate network settings for the networking device;
    configure the networking device to provide wireless connectivity according to the network settings; and
    initiate, by the first client device and based on the network settings, a first wireless connection to the networking device, wherein the first wireless connection is initiated to request, on behalf of a user, access to a user interface for configuring the networking device, wherein the networking device is configured to, prior to granting access, authenticate the user requesting access.

7. The logic of claim 6, wherein the user requesting access is authenticated based on a digital certificate.

8. The logic of claim 7, wherein the digital certificate comprises an X.509 client certificate generated based on a predetermined security policy, wherein the first wireless connection is created without requiring user specification of the network settings, and wherein the user is not authenticated based on any password.

9. The logic of claim 6, wherein the network settings specify a network identifier, a network password, and a wireless security protocol.

10. The logic of claim 6, wherein the logic is further operable to:
    initiate, by a second client device and based on the network settings, a second wireless connection to the networking device, without requiring the user to specify any of the network settings.

11. A system comprising:
    one or more computer processors;
    logic encoded in one or more tangible media for execution and, when executed by the one or more computer processors, operable to:
        discover a networking device within a wireless connectivity range from a first client device;
        upon determining that the networking device is configured with factory default settings, based on the networking device having a network identifier conforming to a predetermined format that includes a predefined character sequence contained in the network identifier, generate network settings for the networking device;
        configure the networking device to provide wireless connectivity according to the network settings; and
        initiate, by the first client device and based on the network settings, a first wireless connection to the networking device, wherein the first wireless connection is initiated to request, on behalf of a user, access to a user interface for configuring the networking device, wherein the networking device is configured to, prior to granting access, authenticate the user requesting access.

12. The system of claim 11, wherein the user requesting access is authenticated based on a digital certificate.

13. The system of claim 12, wherein the digital certificate comprises an X.509 client certificate generated based on a predetermined security policy, wherein the first wireless connection is created without requiring user specification of the network settings, and wherein the user is not authenticated based on any password.

14. The system of claim 11, wherein the network settings specify a network identifier, a network password, and a wireless security protocol.

15. The system of claim 11, wherein the logic is further operable to:
    initiate, by a second client device and based on the network settings, a second wireless connection to the networking device, without requiring the user to specify any of the network settings.

* * * * *